(12) United States Patent
Kanou

(10) Patent No.: US 10,914,975 B2
(45) Date of Patent: Feb. 9, 2021

(54) CIRCUIT SUBSTRATE AND DISPLAY DEVICE

(71) Applicant: Japan Display Inc., Tokyo (JP)

(72) Inventor: Ryo Kanou, Tokyo (JP)

(73) Assignee: Japan Display Inc., Tokyo (JP)

(*) Notice: Subject to any disclaimer, the term of this patent is extended or adjusted under 35 U.S.C. 154(b) by 105 days.

(21) Appl. No.: 15/795,818

(22) Filed: Oct. 27, 2017

(65) Prior Publication Data

US 2018/0120616 A1 May 3, 2018

(30) Foreign Application Priority Data

Oct. 31, 2016 (JP) .................. 2016-213063

(51) Int. Cl.
| | | |
|---|---|---|
| G02F 1/1333 | (2006.01) | |
| G06F 3/041 | (2006.01) | |
| G02F 1/1343 | (2006.01) | |
| G02F 1/1362 | (2006.01) | |
| G06F 3/044 | (2006.01) | |

(52) U.S. Cl.
CPC ........ G02F 1/13338 (2013.01); G02F 1/1343 (2013.01); G02F 1/133345 (2013.01); G02F 1/136286 (2013.01); G06F 3/0412 (2013.01); G06F 3/04164 (2019.05); *G06F 3/044* (2013.01)

(58) Field of Classification Search
CPC .......... G02F 1/133345; G02F 1/13338; G02F 1/1343; G02F 1/136286; H05K 1/147; G06F 3/044; G06F 3/0412
See application file for complete search history.

(56) References Cited

U.S. PATENT DOCUMENTS

| | | | | |
|---|---|---|---|---|
| 5,939,952 A | * | 8/1999 | Noda | .................. H01B 7/0876 333/1 |
| 2009/0153790 A1 | * | 6/2009 | Tashiro | ............... G02F 1/13452 349/149 |
| 2011/0121922 A1 | * | 5/2011 | Blair | ........................ H01P 3/00 333/238 |

FOREIGN PATENT DOCUMENTS

| | | |
|---|---|---|
| JP | 2001-007458 | 1/2001 |
| JP | 2003-224408 | 8/2003 |
| JP | 5445011 B2 | 3/2014 |
| JP | 2014-103151 | 6/2014 |

OTHER PUBLICATIONS

Japanese Office Action dated Feb. 4, 2020 in corresponding Japanese Application No. 2016-213063.

* cited by examiner

*Primary Examiner* — Alexander Eisen
*Assistant Examiner* — Cory A Almeida
(74) *Attorney, Agent, or Firm* — K&L Gates LLP

(57) ABSTRACT

According to one embodiment, a display device includes a display panel including a terminal part, a first insulating layer, a first line disposed on a first surface of the first insulating layer, a second line disposed on a second surface of the first insulating layer opposed to the first surface, a first ground line configured to disposed on the first surface, a second ground line configured to disposed on the first surface, a third ground line configured to disposed on the second surface, a fourth ground line configured to disposed on the second surface, and a circuit substrate including a connector part electrically connected to the terminal part.

18 Claims, 23 Drawing Sheets

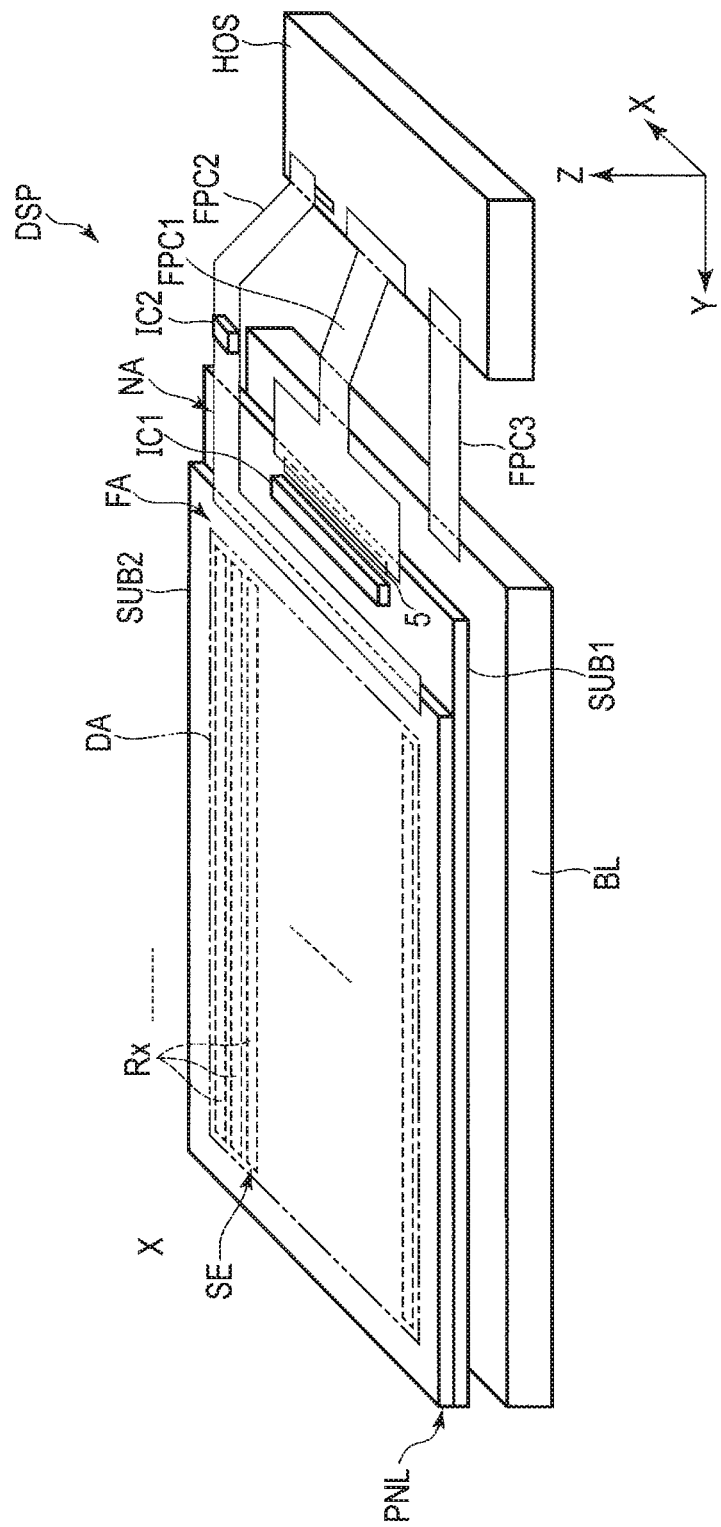
F I G. 1

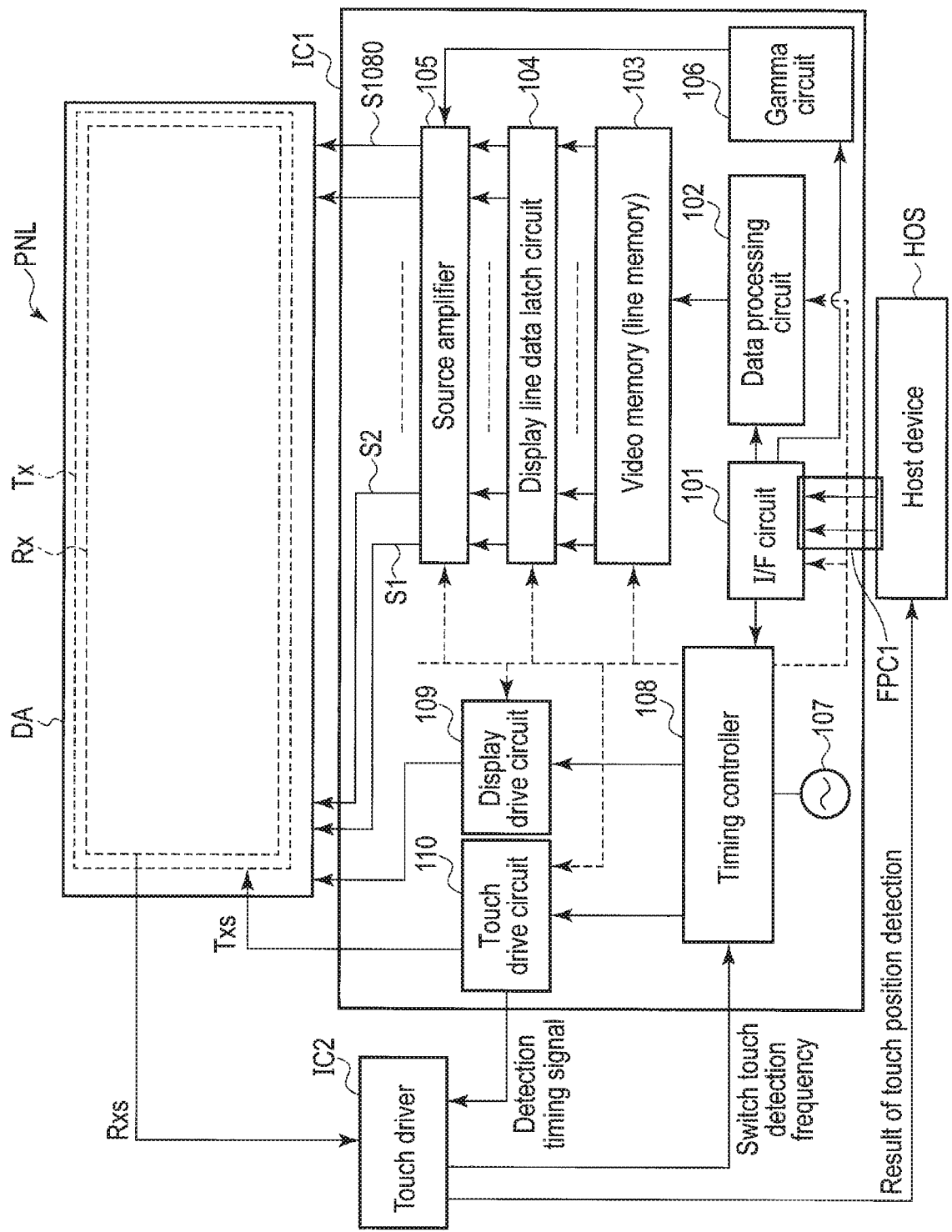
F I G. 4

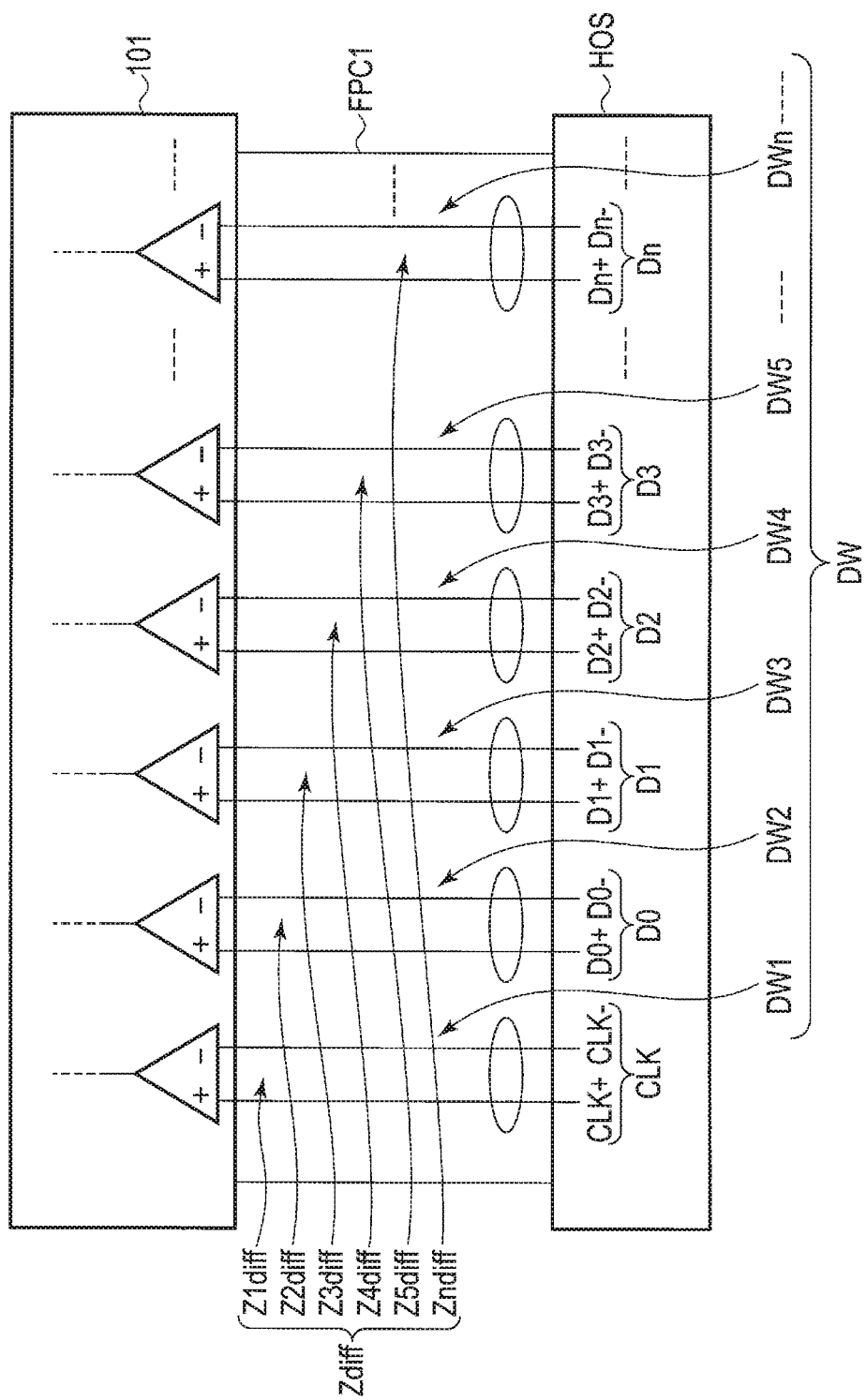
F I G. 5

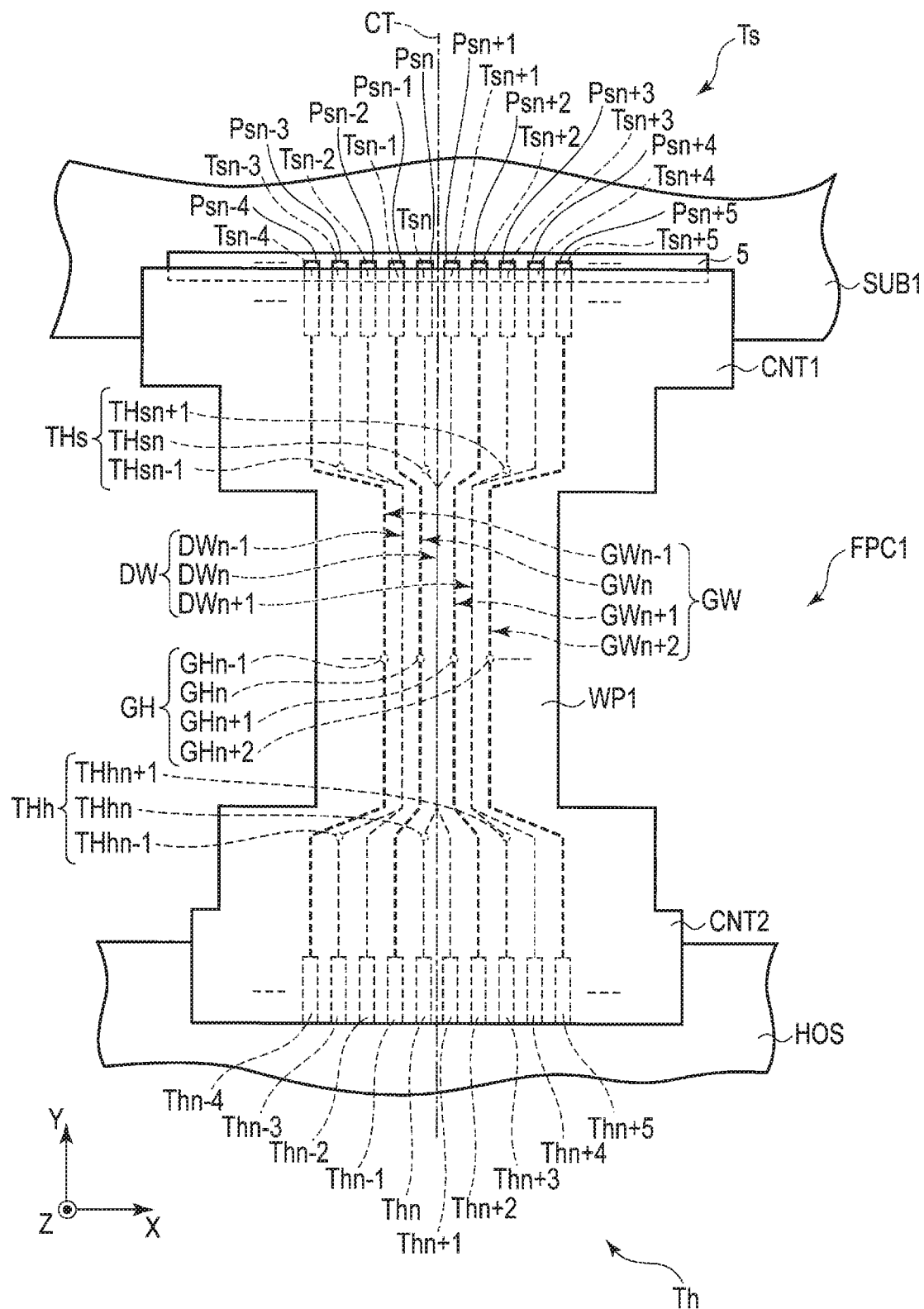
F I G. 9

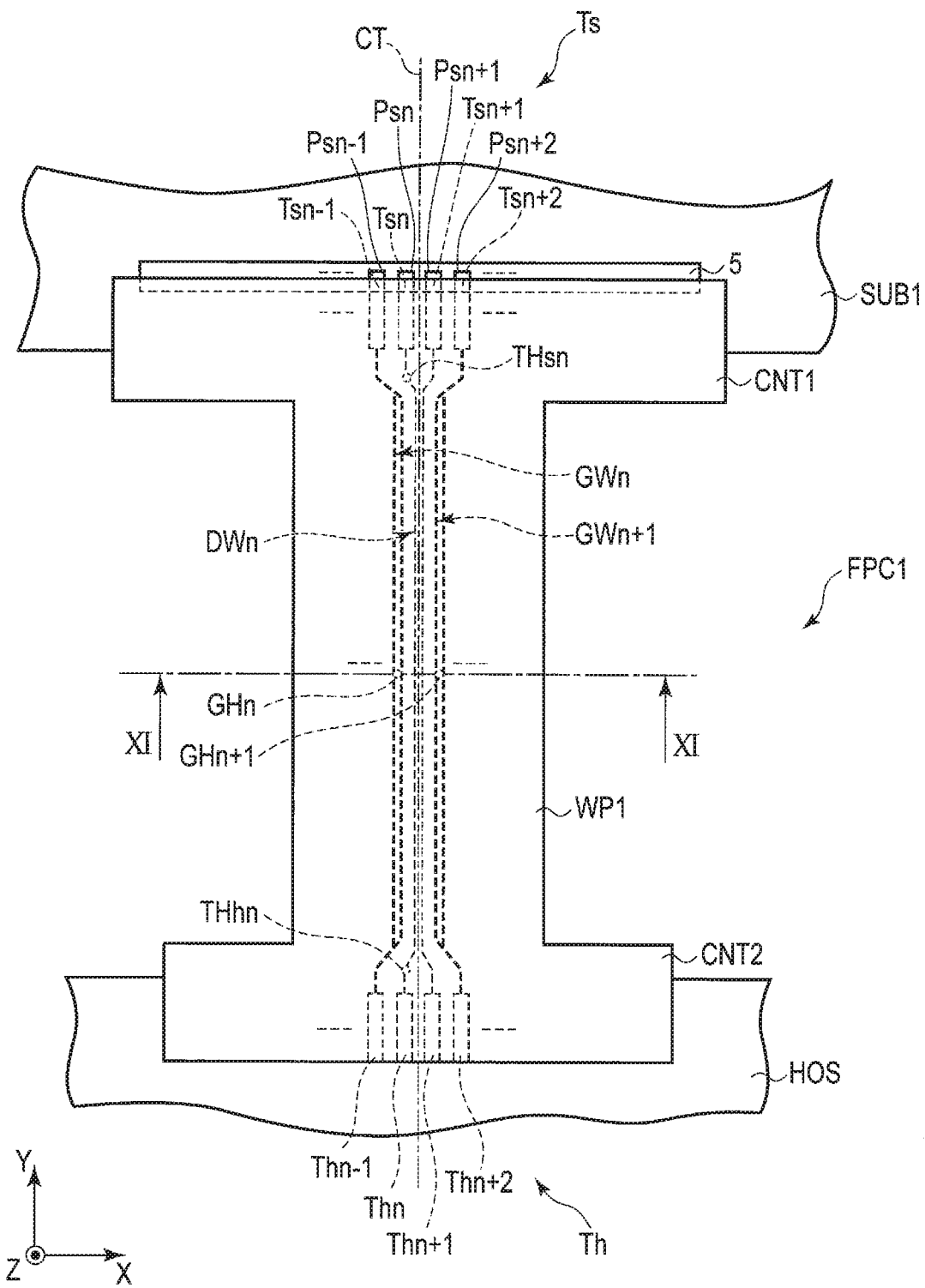
F I G. 10

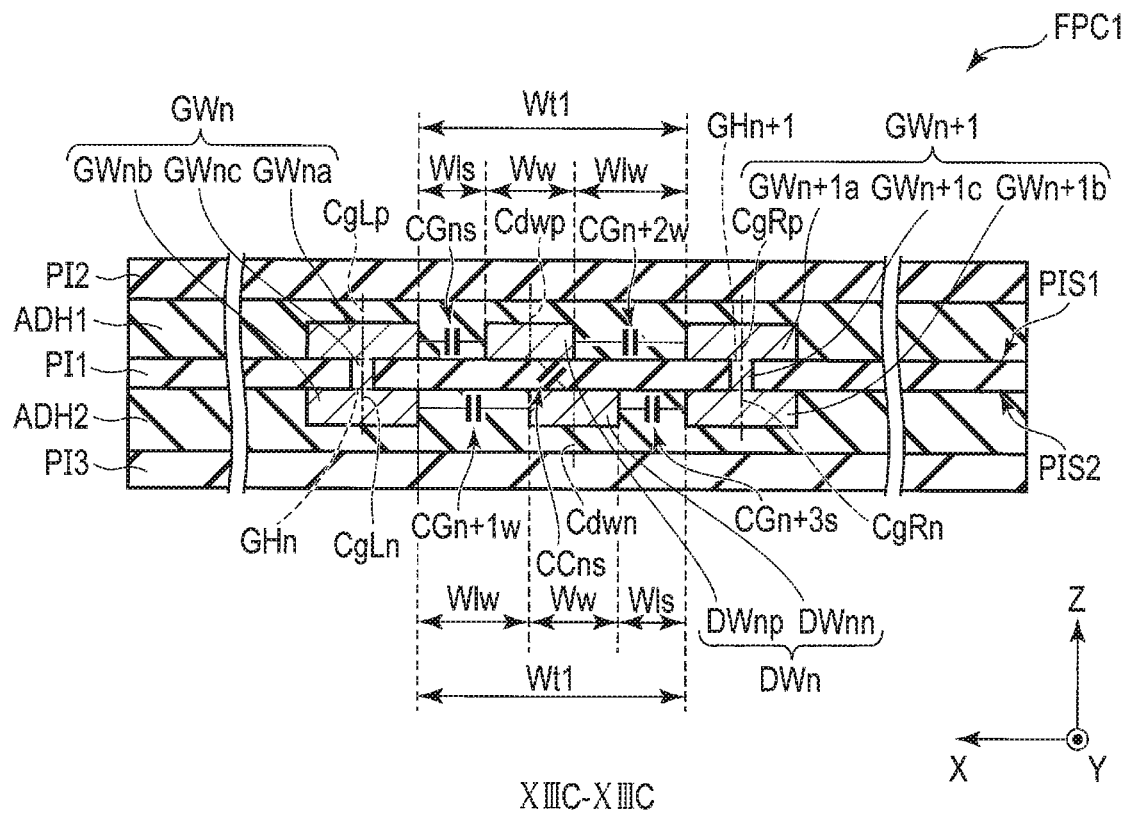
F I G. 13C

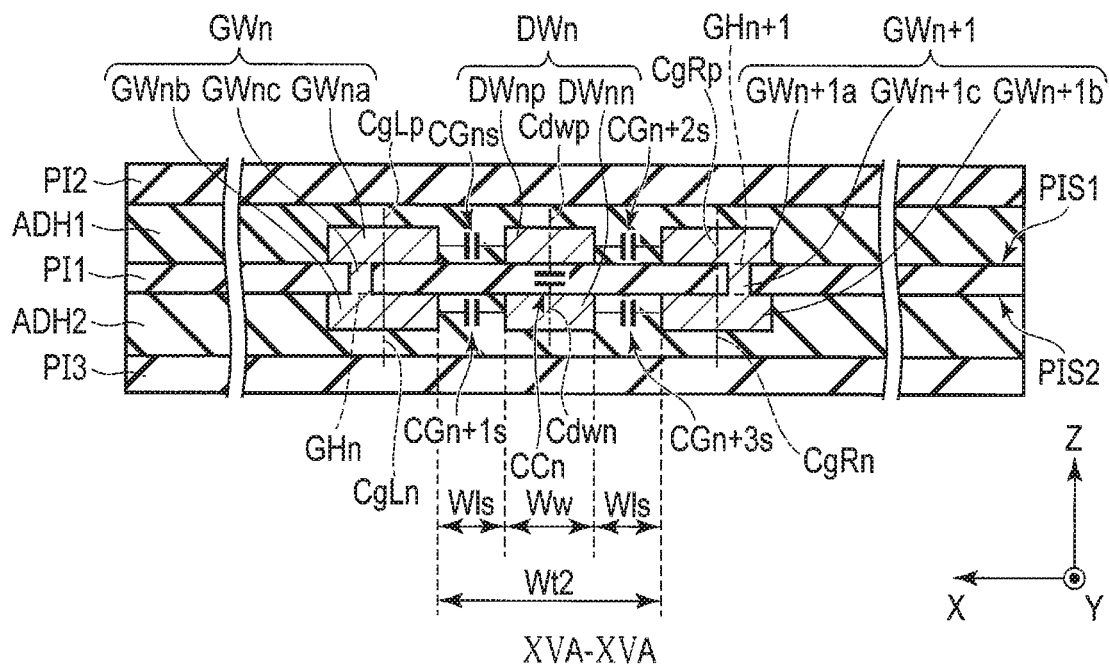
F I G. 15A
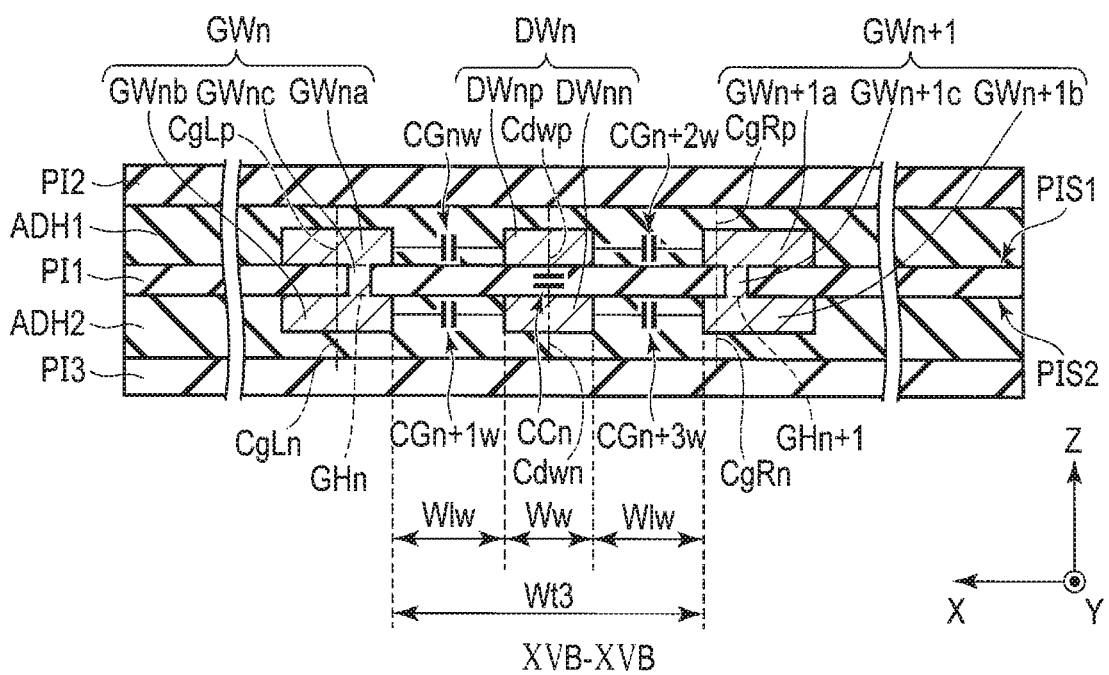
F I G. 15B

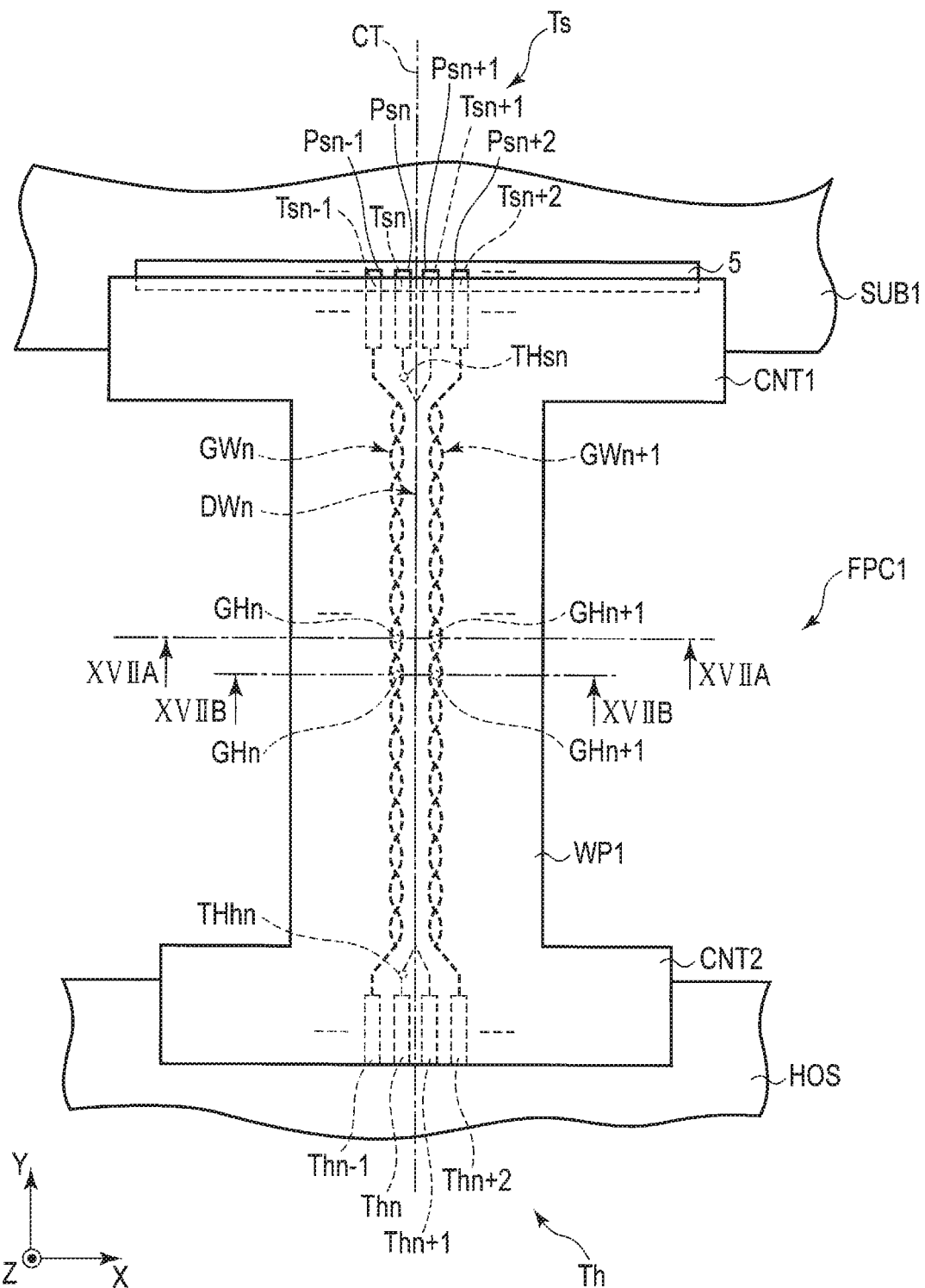
F I G. 16

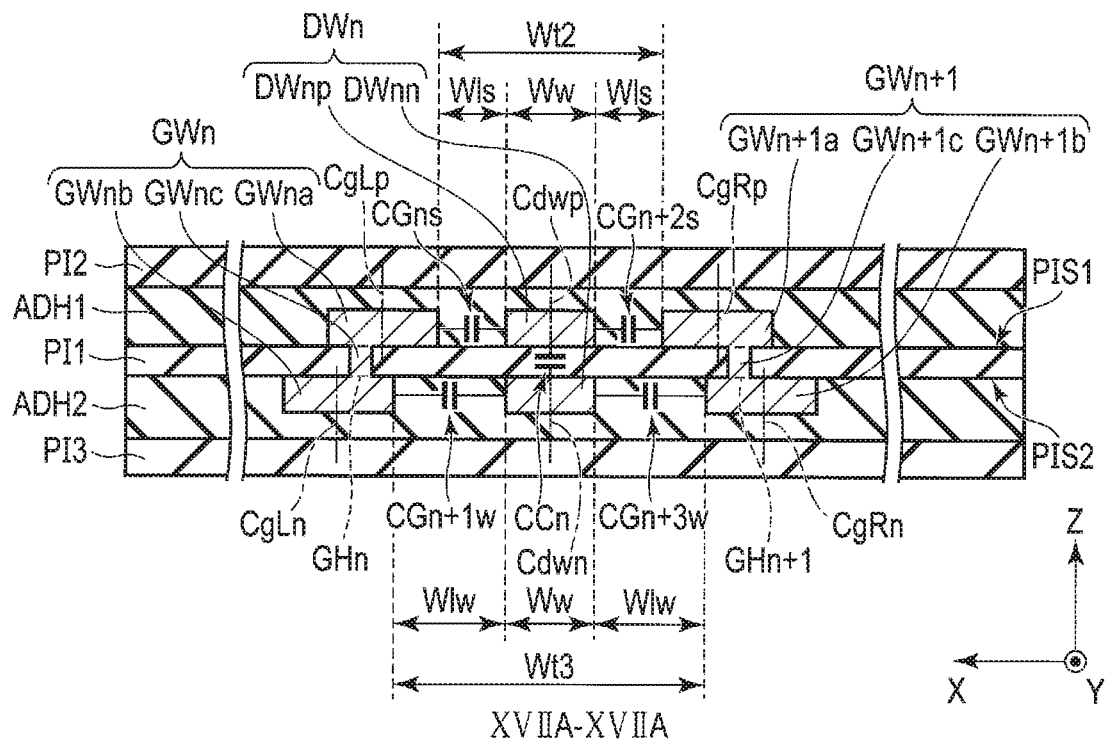
F I G. 17A
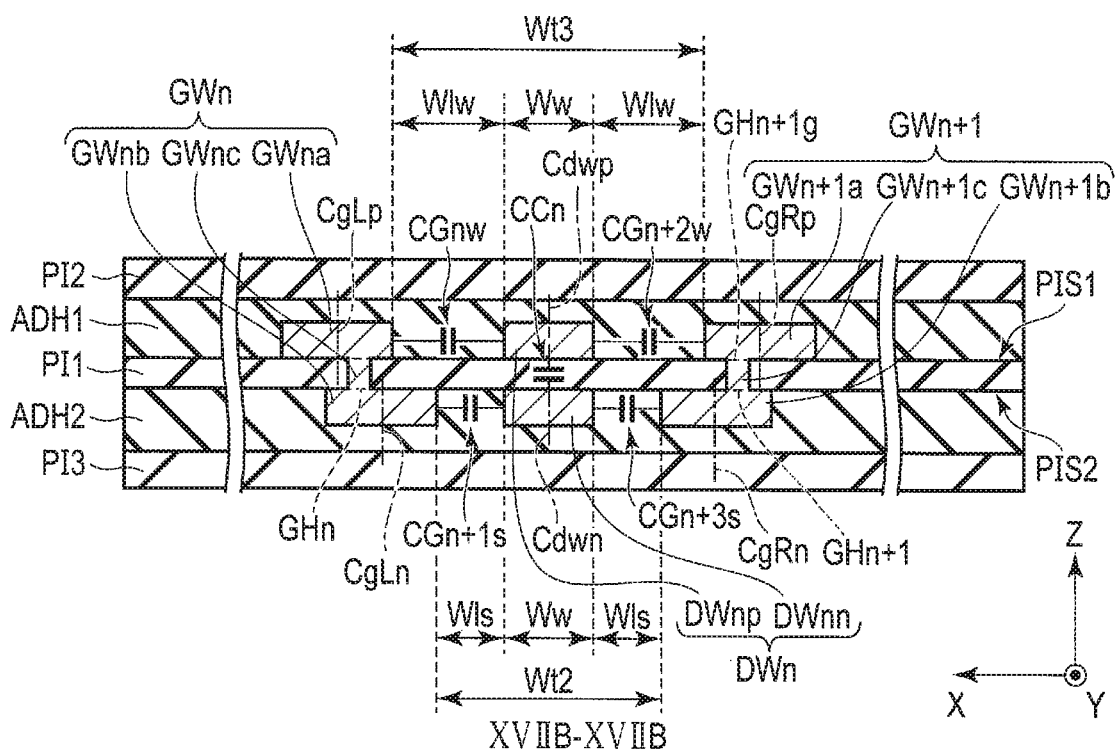
F I G. 17B

CIRCUIT SUBSTRATE AND DISPLAY DEVICE

CROSS-REFERENCE TO RELATED APPLICATIONS

This application is based upon and claims the benefit of priority from Japanese Patent Application No. 2016-213063, filed Oct. 31, 2016, the entire contents of which are incorporated herein by reference.

FIELD

Embodiment described herein relate generally to a circuit substrate and a display device.

BACKGROUND

In recent years, various techniques of downsizing display devices are studied. As a possible approach, for example, a flexible printed circuit of a display device is miniaturized to decrease the production cost and to improve the liberty of design.

SUMMARY

The present application generally relates to a circuit substrate and a display device.

According to one embodiment, a display device includes a display panel including a terminal part, a first insulating layer, a first line disposed on a first surface of the first insulating layer, a second line disposed on a second surface of the first insulating layer opposed to the first surface, a first ground line configured to disposed on the first surface, a second ground line configured to disposed on the first surface, a third ground line configured to disposed on the second surface, a fourth ground line configured to disposed on the second surface, and a circuit substrate including a connector part electrically connected to the terminal part.

Additional features and advantages are described herein, and will be apparent from the following Detailed Description and the figures.

BRIEF DESCRIPTION OF THE DRAWINGS

FIG. 1 is a perspective view of an example of the structure of a display device of a first embodiment.

FIG. 4 is a schematic view of an example of a circuit structure inside a panel driver.

FIG. 5 is a schematic view of an example of a model of signal transmission lines using a differential method.

FIG. 9 is a plan view of an example of the structure of a flexible printed circuit of a variation.

FIG. 10 is a plan view showing an example of the structure of a flexible printed circuit of a second embodiment.

FIG. 13C is a cross-sectional view of a part of the structure of the flexible printed circuit taken along line XIIIC-XIIIC of FIG. 12.

FIG. 15A is a cross-sectional view of a part of the structure of the flexible printed circuit taken along line XVA-XVA of FIG. 14.

FIG. 15B is a cross-sectional view of a part of the structure of the flexible printed circuit taken along line XVB-XVB of FIG. 14.

FIG. 16 is a plan view of an example of a flexible printed circuit of a fifth embodiment.

FIG. 17A is a cross-sectional view of a part of the structure of the flexible printed circuit taken along line XVIIA-XVIIA of FIG. 16.

FIG. 17B is a cross-sectional view of a part of the structure of the flexible printed circuit taken along line XVIIB-XVIIB of FIG. 16.

DETAILED DESCRIPTION

Figure 2:
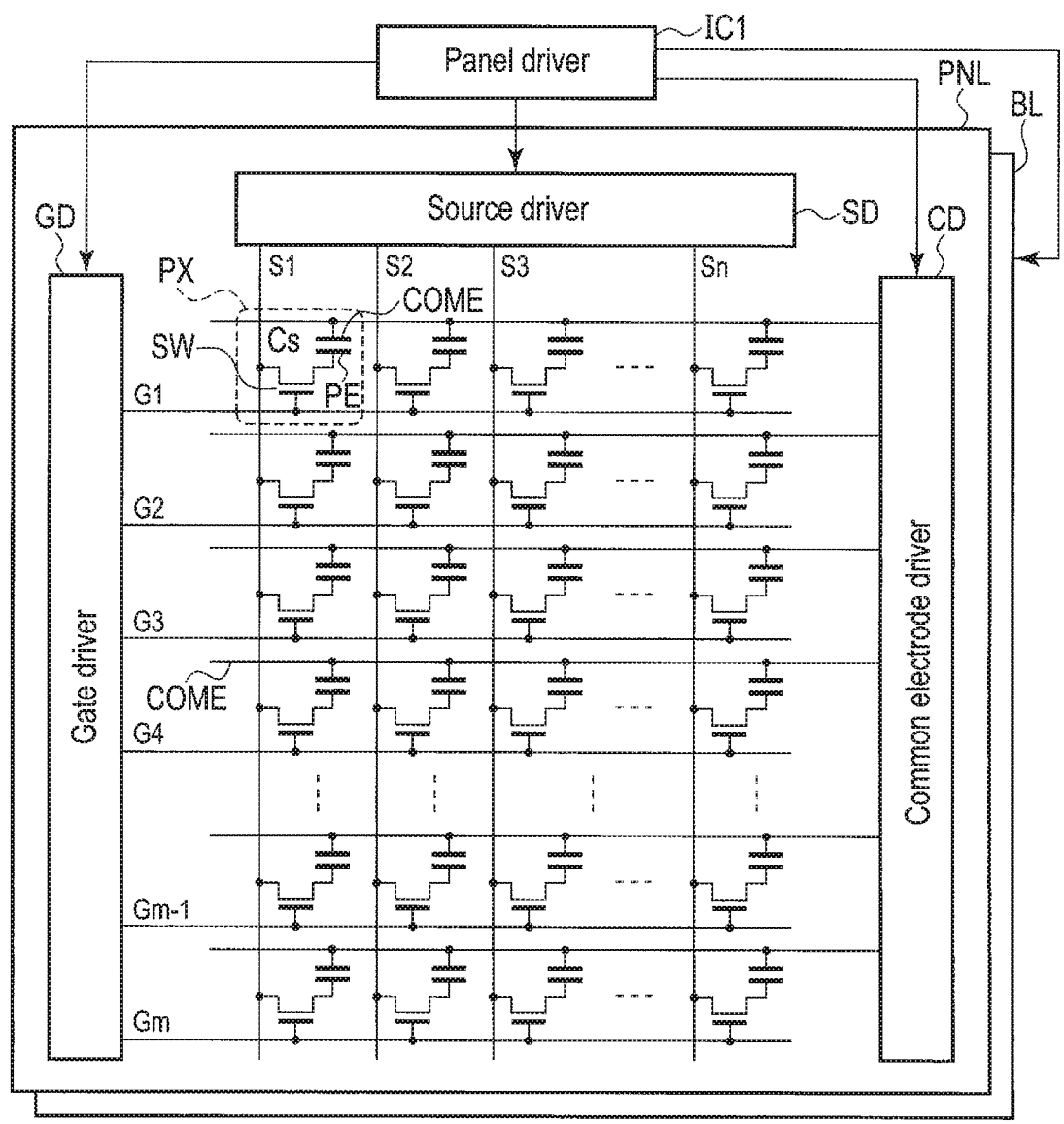
FIG. 2 is a schematic view of a display panel of the display device of the first embodiment.

In general, according to one embodiment, a display device comprising: a display panel including a terminal part; a first insulating layer; a first line disposed on a first surface of the first insulating layer and configured to transmit a differential signal; a second line disposed on a second surface of the first insulating layer opposed to the first surface and configured to produce a capacitance coupling with the first line and to transmit the differential signal with the first line; a first ground line configured to produce a capacitance coupling with the first line and disposed on the first surface while being apart from the first line; a second ground line configured to produce a capacitance coupling with the first line and disposed on the first surface while being apart from the first line in the side opposite to the first ground line; a third ground line configured to produce a capacitance coupling with the second line and disposed on the second surface while being apart from the second line; a fourth ground line configured to produce a capacitance coupling with the second line and disposed on the second surface while being apart from the second line in the side opposite to the third ground line; and a circuit substrate including a connector part electrically connected to the terminal part.

According to another embodiment, a circuit substrate comprising: a first insulating layer; a first line disposed on a first surface of the first insulating layer and configured to transmit a differential signal; a second line disposed on a second surface of the first insulating layer opposed to the first surface and configured to produce a capacitance coupling with the first line and to transmit the differential signal with the first line; a first ground line configured to produce a capacitance coupling with the first line and disposed on the first surface while being apart from the first line; a second ground line configured to produce a capacitance coupling with the first line and disposed on the first surface while being apart from the first line in the side opposite to the first ground line; a third ground line configured to produce a capacitance coupling with the second line and disposed on the second surface while being apart from the second line; and a fourth ground line configured to produce a capacitance coupling with the second line and disposed on the second surface while being apart from the second line in the side opposite to the third ground line.

Hereinafter, various embodiments will be described with reference to the accompany drawings. Note that, the disclosure is merely an example, and any changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the structural elements having functions, which are identical or similar to the functions of the structural elements described in connection with preceding drawings, are denoted by like reference numerals, and an overlapping detailed description may be omitted.

Embodiments described herein can be applied to a liquid crystal display device, self-luminous display device such as organic electroluminescence display device, electronic paper display devices with electrophoretic elements, microelectromechanical system (MEMS)-applied display devices, and electrochromism-applied display devices.

FIG. 1 is a perspective view of an example of the structure of a display device DSP of a first embodiment. In the present embodiment, the display device DSP is a display device with a touch sensing function (hereinafter referred to as touch sensing display device). There are, for example, an on-cell type touch sensing display device in which a touch panel is formed on a surface of the display device and an in-cell type touch sensing display device in which a common electrode for image display which is essentially disposed in the display device is also used as one of a pair of touch sensing electrodes and the other electrode (touch sensing electrode) is disposed to cross the common electrode. Hereinafter, the display device DSP of the present embodiment is an in-cell type display device. A first direction X, second direction Y, and third direction Z are orthogonal to each other; however, they may cross at an angle other than 90 degrees. The first direction X and the second direction Y are parallel to the main surface of the substrate of the display device DSP, the first direction X corresponds to a width direction of the display device DSP, and the third direction Z corresponds to a thickness direction of the display device DSP. Here, the figure shows a plan view of the display device DSP in an X-Y plane defined by the first direction X and the second direction Y. In the following description, seeing the X-Y plane in the third direction Z is referred to as a plan view.

As shown in FIG. 1, the display device DSP includes a display panel PNL. The display panel PNL is a touch sensing mechanism integrated display panel. The display panel PNL is, for example, a display panel including a liquid crystal layer as its display layer or an organic electroluminescence (EL) panel including an organic luminescent layer as its display layer. In this example, the display panel PNL includes a liquid crystal layer as its display layer.

The display panel PNL includes a first substrate SUB1 (array substrate), second substrate SUB2 (counter substrate) disposed to be opposed to the first substrate SUB1, and liquid crystal layer (which is not shown) formed between the first substrate SUB1 and the second substrate SUB2. In the following description, directions orthogonal to the X-Y plane, that is, a direction from the first substrate SUB1 to the second substrate SUB2 along the third direction Z will be referred to as above (or up), and a direction from the second substrate SUB2 to the first substrate SUB1 along the third direction Z will be referred to as below (or down). In an area where the first substrate SUB1 and the second substrate SUB2 are opposed to each other, the display panel PNL includes a display area (active area) DA used for image display and a periphery area FA disposed between the display area DA and the ends of the display panel PNL. In the display panel PNL, the first substrate SUB1 includes a non-opposed area NA which is not opposed to the second substrate SUB2. In the example depicted, a panel driver (liquid crystal driver) IC1 configured to drive the display panel PNL and a mount terminal 5 which is electrically connected to the panel driver IC1 are mounted in the non-opposed area NA on the first substrate SUB1. A flexible printed circuit FPC1 which supplies image data to the display panel PNL is electrically connected to the mount terminal 5.

The display panel PNL is formed integrally with, for example, a capacitive touch detection mechanism SE. In FIG. 1, on the surface of the display area DA of the display panel PNL, a detection electrode Rx of the touch detection mechanism SE is provided. The detection electrode Rx is, for example, a transparent electrode formed of indium tin oxide (ITO) or the like. Note that the detection electrode Rx may be formed outside of the display panel PNL or may be formed inside the display panel PNL. The touch detection mechanism SE is controlled by a touch driver IC2.

Furthermore, a host device HOS is provided outside the display device DSP and the host device HOS is electrically connected to the display panel PNL through the flexible printed circuit FPC1 and the panel driver IC1. Furthermore, the host device HOS is electrically connected to the touch detection mechanism SE through a flexible printed circuit FPC2 and the touch driver IC2.

Note that the panel driver IC1 and the touch driver IC2 may be formed as a single chip. IF the touch driver IC2 and the panel driver IC1 are the same chip, the chip may be disposed on the second substrate SUB2, flexible printed circuit FPC1, or flexible printed circuit FPC2, and the flexible printed circuit FPC1 or the flexible printed circuit FPC2 may be omitted.

In the lower side of the first substrate SUB1 (that is, in the back surface side of the display panel PNL), a backlight unit BL as a light device configured to illuminate the display panel PNL is disposed. A flexible printed circuit FPC3 electrically connects the backlight unit BL and the host device HOS. Various backlight units can be applied to the backlight unit BL, and a light source may be a light emitting diode (LED) or a cold cathode fluorescent lamp (CCFL). Here, the backlight unit BL is disposed in the back surface side of the display panel PNL in this example; however, a front light disposed in the display surface side of the display panel PNL may be used instead. Furthermore, a light device including a light guide plate with an LED or a cold cathode tube disposed in the sides thereof may be used or a light device including a spotted light source in which light emitting elements are arranged in a plane may be used. Note that, if the display device DSP is a reflective display device, or if the display panel PNL is formed of organic EL, the light device may be omitted.

Although they are omitted in FIG. 1, the display device DSP includes a secondary battery, power source circuit, and the like.

Note that the display panel PNL of the present embodiment may be a transmissive type, reflective type, or transflective type. The display device DSP to which a transmissive display panel PNL is applied has a transmissive display function in which, as described above, the backlight unit BL is disposed in the back surface side of the first substrate SUB1 and light from the backlight unit BL is selectively passed. The display device DSP to which a reflective display panel PNL is applied has a reflective display function in which light from the front surface side (or in the display surface side) of the second substrate SUB2 is selectively reflected. Note that an auxiliary light source may be disposed in the front surface side of the reflective display panel PNL. The display device DSP to which a transflective display panel PNL is applied has both the transmissive display function and the reflective display function.

FIG. 2 is a schematic view of the display panel PNL of the display device DSP of the first embodiment. FIG. 2 mainly shows a schematic structure of the display panel PNL of the display device DSP. As shown in FIG. 2, the display panel PNL includes a plurality of display pixels PX (display elements) arranged in a matrix. Furthermore, the display panel PNL includes scan lines G (G1, G2, . . . Gm) extending in the rows of the display pixels PX, signal lines S (S1, S2, . . . Sn) arranged in the columns of the display pixels PX, and a pixel switch SW disposed in the proximity of a crossing point of the scan line G and the signal line S.

The pixel switch SW includes a thin film transistor (TFT). A gate electrode of the pixel switch SW is electrically connected to a corresponding scan line G. A source electrode of the pixel switch SW is electrically connected to a corresponding signal line S. Furthermore, a drain electrode of the pixel switch SW is electrically connected to a corresponding pixel electrode PE.

Furthermore, a gate driver GD and a source driver SD are provided with the display panel PNL to drive the display pixels PX. A plurality of scan lines G are electrically connected to an output terminal of the gate driver GD. A plurality of signal lines S are electrically connected to an output terminal of the source driver SD.

The gate driver GD sequentially supplies an on-state voltage to the scan lines G to supply the on-state voltage to the gate electrode of the pixel switch SW electrically connected to a selected scan line G. When the on-state voltage is supplied to the gate electrode, conduction between the source electrode and the drain electrode of the pixel switch SW is established.

The source driver SD supplies an output signal corresponding to each of the signal lines S. The signal supplied to the signal line S is supplied to a corresponding pixel electrode PE through the pixel switch SW in which the conduction between the source electrode and the drain electrode is established.

Furthermore, the display panel PNL includes a common electrode driver CD. The common electrode driver CD is a circuit which supplies a drive signal to (applies a drive voltage to) a common electrode COME of the display device DSP. The common electrode COME will be described later, and the pixel electrode PE and the common electrode COME are arranged to be opposed to each other with an insulating film therebetween. The pixel electrode PE, common electrode COME, and insulating film form a capacitance CS.

Note that the gate driver GD, source driver SD, and common electrode driver CD are disposed in the area surrounding the display panel PNL (in a frame), and are controlled by the panel driver IC1. Furthermore, the panel driver IC1 controls the operation of the backlight unit BL.

In FIG. 2, only one gate driver GD is shown; however, the display panel PNL may include a plurality of (for example, two) gate drivers GD. With the structure including two gate drivers, one gate driver is electrically connected to scan lines G1, G3, . . . Gm−1 while the other gate driver is electrically connected to scan lines G2, G4, . . . Gm. Note that two gate drivers are arranged to be opposed to each other with the display pixels PX interposed therebetween.

Figure 3:
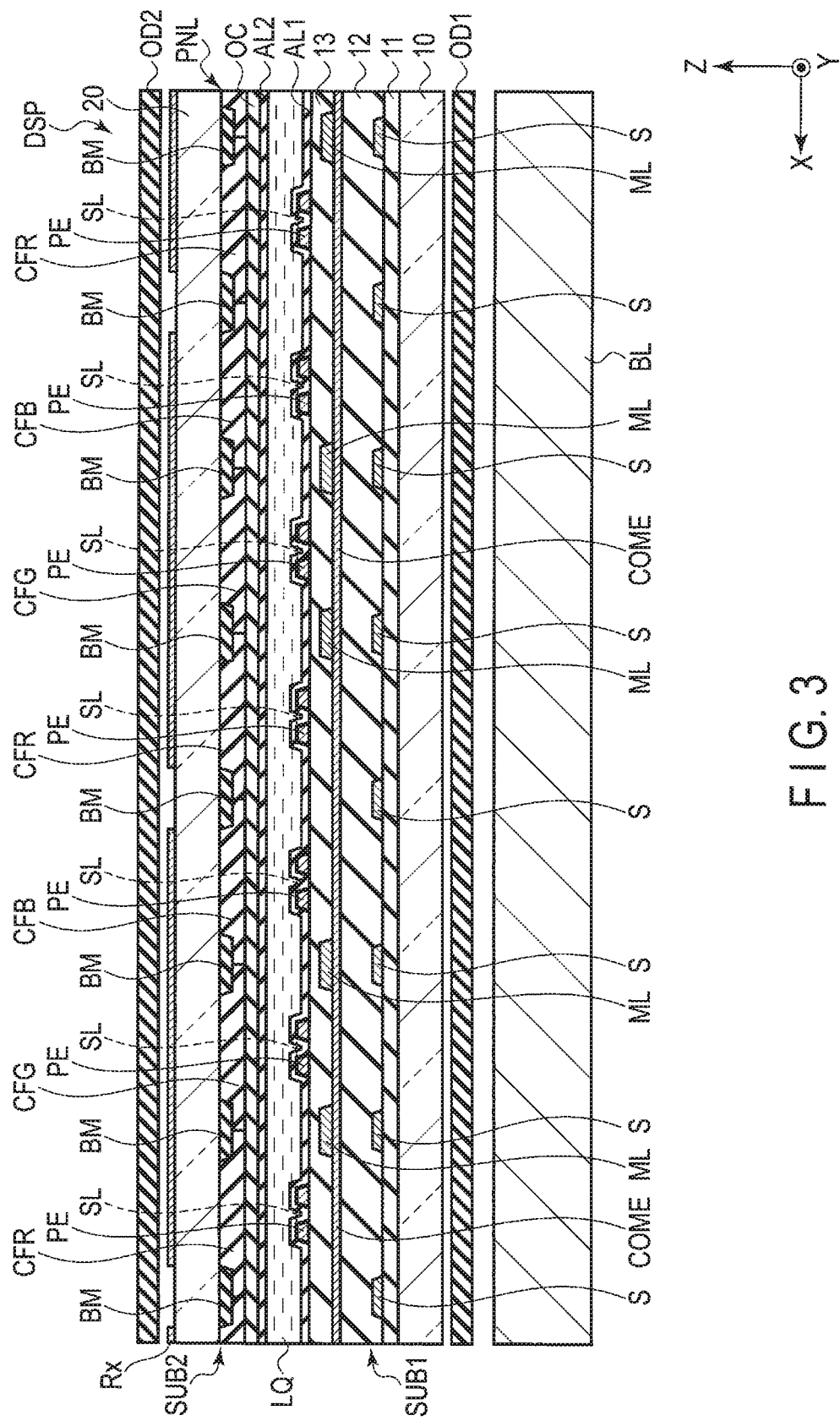
FIG. 3 is a schematic cross-sectional view of the structure of the display device.

FIG. 3 is a schematic cross-sectional view of the structure of the display device DSP. Here, the display device DSP is cut along the first direction X in the cross-sectional view.

The display device DSP includes the display panel PNL, backlight unit BL, first optical element OD1, and second optical element OD2.

Note that, in FIG. 3, the display panel PNL corresponds to a fringe field switching (FFS) mode as its display mode; however, it may correspond to other display modes.

The display panel PNL includes, as described above, the first substrate SUB1, second substrate SUB2, and liquid crystal layer LQ. The first substrate SUB1 and the second substrate SUB2 are adhered together with a certain cell gap formed therebetween. The liquid crystal layer LQ is maintained in the cell gap between the first substrate SUB1 and the second substrate SUB2.

The first substrate SUB1 includes, for example, a first insulating substrate 10, signal line S, common electrode COME, metal layer ML, pixel electrode PE, first insulating film 11, second insulating film 12, third insulating film 13, and first alignment film AL1. Here, the pixel electrode PE and the common electrode COME form the display pixels PX with the pixel area of the liquid crystal layer LQ and the display pixels PX are, as explained with reference to FIG. 2, arranged in a matrix in the display panel PNL.

The first insulating substrate 10 is formed of a light transmissive first insulating substrate 10 such as a glass substrate or a resin substrate. The first insulating film 11 is disposed on the first insulating substrate 10. The signal line S is disposed on the first insulating film 11. Although this is not shown, the scan line G, gate electrode of the switching element (pixel switch SW), and semiconductor layer are positioned between the first insulating substrate 10 and the first insulating film 11. The source electrode, drain electrode, and the like of the switching element are disposed on the first insulating film 11.

The second insulating film 12 is disposed on the signal line S and the first insulating film 11. The common electrode COME is formed on the second insulating film 12. The common electrode COME is composed of a plurality of segments. The segments of the common electrode COME each extends in the direction X and are arranged in the direction Y at certain intervals. The common electrode COME is formed of a transparent conductive material such as indium tin oxide (ITO) or indium zinc oxide (IZO). The metal layer ML contacts the common electrode COME immediately above the signal line S. In the figure depicted, the metal layer ML is positioned above the common electrode COME; however, it may be positioned between the common electrode COME and the second insulating film 12. Furthermore, the metal layer ML may be omitted.

The third insulating film 13 is positioned above the common electrode COME and the metal layer ML. The pixel electrode PE is formed on the third insulating film 13. Each pixel electrode PE is positioned between signal lines S adjacent to each other, and is opposed to the common electrode COME with the third insulating film 13 interposed therebetween. Furthermore, each pixel electrode PE includes a slit SL in a position opposed to the common electrode COME. The first alignment film AL1 covers the pixel electrode PE and the third insulating film 13.

The scan line, signal line S, and metal layer ML are formed of a metal material such as molybdenum, tungsten, titanium, or aluminum, and may be formed as a monolayer structure or a multilayer structure. The common electrode CE and the pixel electrode PE are formed of a transparent conductive material such as ITO or IZO. The first insulating film 11 and the third insulating film 13 are inorganic insulating films, and the second insulating film 12 is an organic insulating film.

Note that the structure of the first substrate SUB1 is not limited to the example depicted, and the pixel electrode PE may be positioned between the second insulating film 12 and the third insulating film 13, and the common electrode CE may be positioned between the third insulating film 13 and the first alignment film ALL In that case, the pixel electrode PE is formed as a flat plate without a slit, and the common electrode CE has a slit opposed to the pixel electrode PE. Furthermore, the pixel electrode PE and the common electrode CE may be formed in a comb shape such that they can engage with each other.

On the other hand, the second substrate SUB2 includes a second insulating substrate 20, light shielding layer (black matrix) BM, color filters CFR, CFG, and CFB, overcoat layer OC, and second alignment film AL2.

The second insulating substrate 20 is light transmissive and formed of a glass substrate or a resin substrate, for example. The light shielding layer BM and the color filters CFR, CFG, and CFB are positioned to be opposed to the first substrate SUB1 of the second insulating substrate 20. The light shielding layer BM defines each pixel and is positioned immediately above the signal line S. The light shielding layer BM is formed on the inner surface of the second insulating substrate 20. The color filters CFR, CFG, and CFB are each opposed to the pixel electrode PE and partly overlap the light shielding layer BM. The color filters CFR, CFG, and CFB are formed on the inner surface of the second insulating substrate 20. The color filter CFR is a red filter, color filter CFG is a green filter, and color filter CFB is a blue filter. The overcoat layer OC covers the color filters CFR, CFG, and CFB. The overcoat layer OC is formed of a transparent resin material. The second alignment film AL2 covers the overcoat layer OC.

Note that the color filters CFR, CFG, and CFB may be disposed in the first substrate SUB1. In the display panel PNL, an additional color filter may be disposed other than the color filters CFR, CFG, and CFB. The color filters may be of four or more colors. As to white pixels, a white color filter may be disposed, or a non-painted resin material may be disposed, or the overcoat layer OC may be disposed without arranging a color filter.

The detection electrode Rx is disposed on the main surface of the second insulating substrate 20 in the upper side in the third direction Z. The detection electrode Rx is formed in an island shape, and a lead line is omitted. The detection electrode Rx is, for example, formed of a metal material such as an aluminum (Al), titanium (Ti), silver (Ag), molybdenum (Mo), tungsten (W), copper (Cu), or chromium (Cr), or of an alloy of a combination of aforementioned materials, or of a transparent conductive material such as ITO or IZO, or of a conductive organic material, or of a dispersion element of micro conductive substances. Furthermore, the detection electrode Rx may be a monolayer structure of the above material or a layered structure. For example, in the layered structure, the detection electrode Rx includes a metal thin line formed of the above metal material and a transparent conductive material. If a metal material is used for the detection electrode Rx, a mesh treatment may be performed, or, preferably, a non-visualization treatment such as plating with a black material may be performed.

The backlight unit BL is, as described above, positioned in the back surface side of the display panel PNL in the lower side in the third direction X. The first optical element OD1 is disposed between the first insulating substrate 10 and the backlight unit BL. The second optical element OD2 is disposed above the detection electrode Rx. The first optical element OD1 and the second optical element OD2 include at least a polarizer. Furthermore, the first optical element OD1 and the second optical element OD2 may include a retardation film if need be.

FIG. 4 schematically shows an example of a circuit structure inside the panel driver IC1. As shown in FIG. 4, the panel driver IC1 includes an interface (I/F) circuit 101, data processing circuit 102, video memory (line memory) 103, display line data latch circuit 104, source amplifier 105, gamma circuit 106, internal oscillator 107, timing controller 108, display drive circuit 109, and touch drive circuit 110. Note that, as described above, the panel driver IC1 is electrically connected to the host device HOS through the flexible printed circuit FPC1.

The host device HOS outputs a pixel signal (pixel data), a synchronization signal, and the like to the I/F circuit 101 through the flexible printed circuit FPC1. The I/F circuit 101 receives the pixel signal, synchronization signal, and the like transmitted from the host device HOS through a flexible printed circuit FPC. The I/F circuit 101 inputs the pixel signal from the host device HOS to the data processing circuit 102. The data processing circuit 102 executes interpolation processing, composition processing, and the like of the input pixel signal to conform to the display of the display panel PNL.

The data processing circuit 102 outputs the image signal after the interpolation processing and the composition processing to the video memory 103. The video memory 103 receives the pixel signal from the data processing circuit 102 and stores the pixel signal. The video memory 103 is, for example, an SRAM or a DRAM. The video memory 103 can be switched to a buffer memory such as first-in first out (FIFO). Note that the video memory can store, for example, a whole image of a single frame (pixel data thereof).

The display line data latch circuit 104 latches the pixel signal stored in the video memory 103 and outputs the latched pixel signal to the source amplifier 105. The source amplifier 105 receives the latched pixel signal, amplifies the pixel signal referring to a voltage of each gradation from the gamma circuit 106, and supplies the analogue-converted pixel signal to the display panel. Note that, although this is not shown, the I/F circuit 101 includes a command register which keeps a command received from the host device HOS and a parameter register which keeps a parameter and the like for gamma correction. Furthermore, although this is not shown, the panel driver IC1 includes a non-volatile memory which stores a parameter and the like for gamma correction, for example. Note that the parameter register may be included in the data processing circuit 102. If the data processing circuit 102 includes the parameter register, the data processing circuit 102 is electrically connected to the gamma circuit 106. Furthermore, the command register and the parameter register may be separated from the I/F circuit 101.

The display panel PNL writes the pixel signal to a display pixel PX gate of which is opened (that is, a pixel in which an on-state voltage is supplied to a gate electrode of a pixel switch SW) through signal lines S (for example, S1 to S1080). Thus, the image display operation of the display panel PNL is performed.

The timing controller 108 operates the whole circuit blocks in the panel driver IC1 in synchronization on the basis of the command received from the host device HOS, for example.

The timing controller 108 receives a basic clock from the internal oscillator 107. The timing controller 108 generates various timing signals on the basis of the basic clock. Furthermore, the timing controller 108 can control increase, decrease, or the like of oscillation frequency of the internal oscillator 107.

The timing controller 108 includes a phase control circuit and maintains a phase relationship between a clock of the internal oscillator 107 (internal clock) and a synchronization signal of an external device (host device HOS) to a certain relationship. The timing controller 108 generates a timing signal of pixel signal writing (vertical synchronization signal and horizontal synchronization signal). In that case, the timing controller 108 generates internal vertical synchronization pulse and horizontal synchronization pulse.

The timing signal generated by the timing controller 108 is stored in, for example, the display drive circuit 109 and the touch drive circuit 110. Note that the timing controller 108 generates various timing signals to supply them to each of the I/F circuit 101, data processing circuit 102, video memory 103, display line data latch circuit 104, and source amplifier 105.

Thus, the timing controller 108 can control the blocks inside the panel driver IC1 altogether.

The display drive circuit 109 controls the source driver (source selection circuit) SD and gate driver GD and designates a line to which the pixel signal is written (and a display pixel PX corresponding thereto) on the basis of the timing signal from the timing controller 108.

The touch drive circuit 110 outputs the vertical synchronization signal and the horizontal synchronization signal to the touch driver IC2 as the timing signal related to the touch detection operation. Furthermore, the touch drive circuit 110 supplies the drive signal Txs to the common electrode COME in a designated time (that is, touch detection period). Thus, a touch detection signal Rxs is output from the detection electrode Rx.

Here, the touch driver IC2 detects a touch position on the basis of the touch detection signal Rxs output from the detection electrode Rx, and outputs a detection result of the touch position to the host device HOS. The host device HOS executes various processes (programming operation) on the basis of the detection result of the touch position output by the touch driver IC2.

FIG. 5 is a schematic view of an example of a signal transmission path using a differential method. Between the host device HOS and the panel driver IC101, a signal is transmitted through the flexible printed circuit FPC1 using the differential method. In the following description, a signal transmitted by the differential method may be referred to as a differential signal. The flexible printed circuit FPC1 includes a plurality of differential lines DW (DW1, DW2, DW3, DW4, DW5, . . . DWn). The differential line DW is formed of a pair of lines. The differential line DW transmits one signal, divided into two signals, through the two lines. For example, signals (current signals) which are reverse-phased from each other (positive side signal and negative side signal) are supplied through the two lines of the differential line DW, respectively. In the following description, a positive side signal will be referred to as a positive signal and a negative side signal will be referred to as a negative signal. FIG. 5 shows differential impedances Zdiff (Z1diff, Z2diff, Z3diff, Z4diff, Z5diff, . . . Zndiff) corresponding to the differential lines DW (DW1, DW2, DW3, DW4, DW5, . . . DWn). The differential impedance Zdiff can be adjusted by changing a design of the pair of lines and peripheral members in the differential line DW.

In the example depicted, the host device HOS transmits a synchronization signal CLK to the panel driver IC101 through the differential line DW1. Thus, in the flexible printed circuit FPC1, a positive signal (CLK+) and a negative signal (CLK−) of the synchronization signal CLK are transmitted to the differential line DW1 with the differential impedance Z1diff. The host device HOS transmits pixel signals D0, D1, D2, D3, . . . Dn to the panel drive IC101 through the differential lines DW2, DW3, DW4, DW5, . . . . Thus, in the flexible printed circuit FPC1, positive signals (D0+, D1+, D2+, D3+, . . . Dn+) and negative signals (D0−, D1−, D2−, D3−, . . . Dn−) of the pixel signals D0, D1, D2, D3, . . . Dn are transmitted to the differential lines DW2, DW3, DW4, DW5, . . . DWn with the differential impedances Z2diff, Z3diff, Z4diff, Z5diff, . . . Zndiff.

Figure 6:
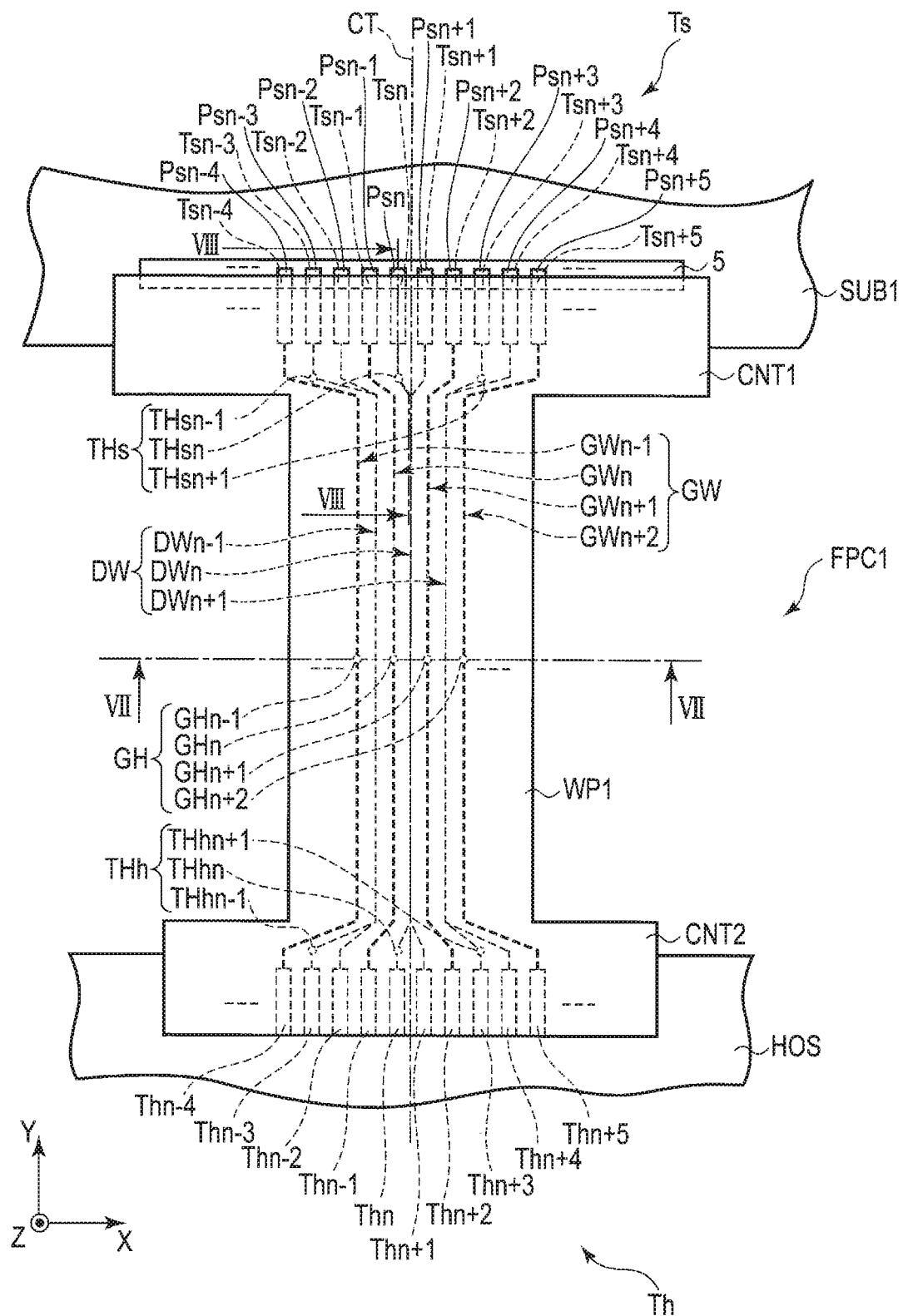
FIG. 6 is a plan view showing an example of the structure of a flexible printed circuit of the first embodiment.

FIG. 6 is a plan view showing an example of the structure of the flexible printed circuit FPC1 of the present embodiment. In FIG. 6, the flexible printed circuit FPC1 is shown in a plan view.

The flexible printed circuit FPC1 can be roughly divided into a connector part CNT1, connector part CNT2, and line part WP1. The connector part CNT1 includes a plurality of terminal parts Ts (Tsn−4, Tsn−3, Tsn−2, Tsn−1, Tsn, Tsn+1, Tsn+2, Tsn+3, Tsn+4, Tsn+5, . . . ). In the connector part CNT1, a plurality of terminal parts Ts are arranged in the edge of the first substrate SUB1 side in the first direction X. The terminal parts Ts are electrically connected to pads Ps (Psn−4, Psn−3, Psn−2, Psn−1, Psn, Psn+1, Psn+2, Psn+3, Psn+4, Psn+5, . . . ) of the mount terminal 5 of the first substrate SUB1. The connector part CNT2 includes a plurality of terminal parts Th (Thn−4, Thn−3, Thn−2, Thn−1, Thn, Thn+1, Thn+2, Thn+3, Thn+4, Thn+5, . . . ). In the connector part CNT2, the terminal parts Th are arranged in the edge of the host device HOS side in the first direction X.

The terminal parts Th are electrically connected to the host device HOS. The line part WP1 is disposed between a connector part CNT1 and a connector part CNT2 and has a width less than a width of the connector parts CNT1 and CNT2. In the following description, the line part WP1 may be referred to as a narrowed part WP1. The terminal parts Ts and the terminal parts Th are electrically connected by the differential lines DW ( ..., DWn−1, DWn, DWn+1, ... ) and ground lines GW ( ..., GWn−1, GWn, GWn+1, GWn+2, ... ) extending from the connector part CNT1 to the connector part CNT2.

In the example depicted, in the flexible printed circuit FPC1, the line part WP1 extends in the second direction Y between the connector part CNT1 and the connector part CNT2, and is positioned in the center of the connector part CNT1 and the connector part CNT2 in the first direction X. In the flexible printed circuit FPC1, the differential lines DW and ground lines GW are arranged alternately in the first direction X. The differential line DW extends from the connector part CNT1 to the connector part CNT2 through the line part WP1. The differential line DW extends between the end of the terminal part Ts of the connector part CNT1 and the line part WP1 while inclining to the center position CT side of the line part WP1 (hereinafter, referred to as inside). Furthermore, the differential line DW extends, in the first direction X, between the line part WP1 and the terminal part Th of the connector part CNT2 toward an opposite direction of the inside of the line part WP1 (hereinafter, referred to as outside). The ground line GW extends from the connector part CNT1 to the connector part CNT2 through the line part WP1 as with the differential line DW. The ground line GW extends between the end of the terminal part Ts of the connector part CNT1 and the line part WP1 while inclining to the inside. The ground line GW extends between the line part WP1 and the terminal part Th of the connector part CNT2 to the opposite direction of the inside of the line part WP1 (hereinafter, referred to as outside). The flexible printed circuit FPC1 includes through holes GH ( ..., GHn−1, GHn, GHn+1, GHn+2, ... ) in positions corresponding to the ground lines GW. Although this is not shown, the through holes GH are, in the line part WP1, formed corresponding to the positions of the ground lines GW in the second direction Y at certain intervals. Note that the line part WP1 may not be positioned in the center part of the connector part CNT1 and the connector part CNT2 in the first direction X and may be shifted to one side of the edges of the parts CNT1 and CNT2.

In the example depicted, in a plan view, a pair of line of the differential line DW overlap with each other on the line part WP1. That is, as described later, one of the pair of lines is disposed on the other in the differential line DW. For example, in a plan view, in the differential line DW, one of the pair of lines passes through holes THs ( ..., THsn−1, THsn, THsn+1, ... ) between the end of the connector part CNT1 in the line part WP1 side and the line part WP1 and overlaps with the other line in the line part WP1. On the other hand, in a plan view, in the differential line DW, the other line of the pair of lines passes through holes THh ( ..., THhn−1, THhn, THhn+1, ... ) between the line part WP1 and the terminal part Th of the connector part CNT and extends in parallel to the different line in the first direction X before the terminal part Th of the connector part CNT2.

Figure 7:
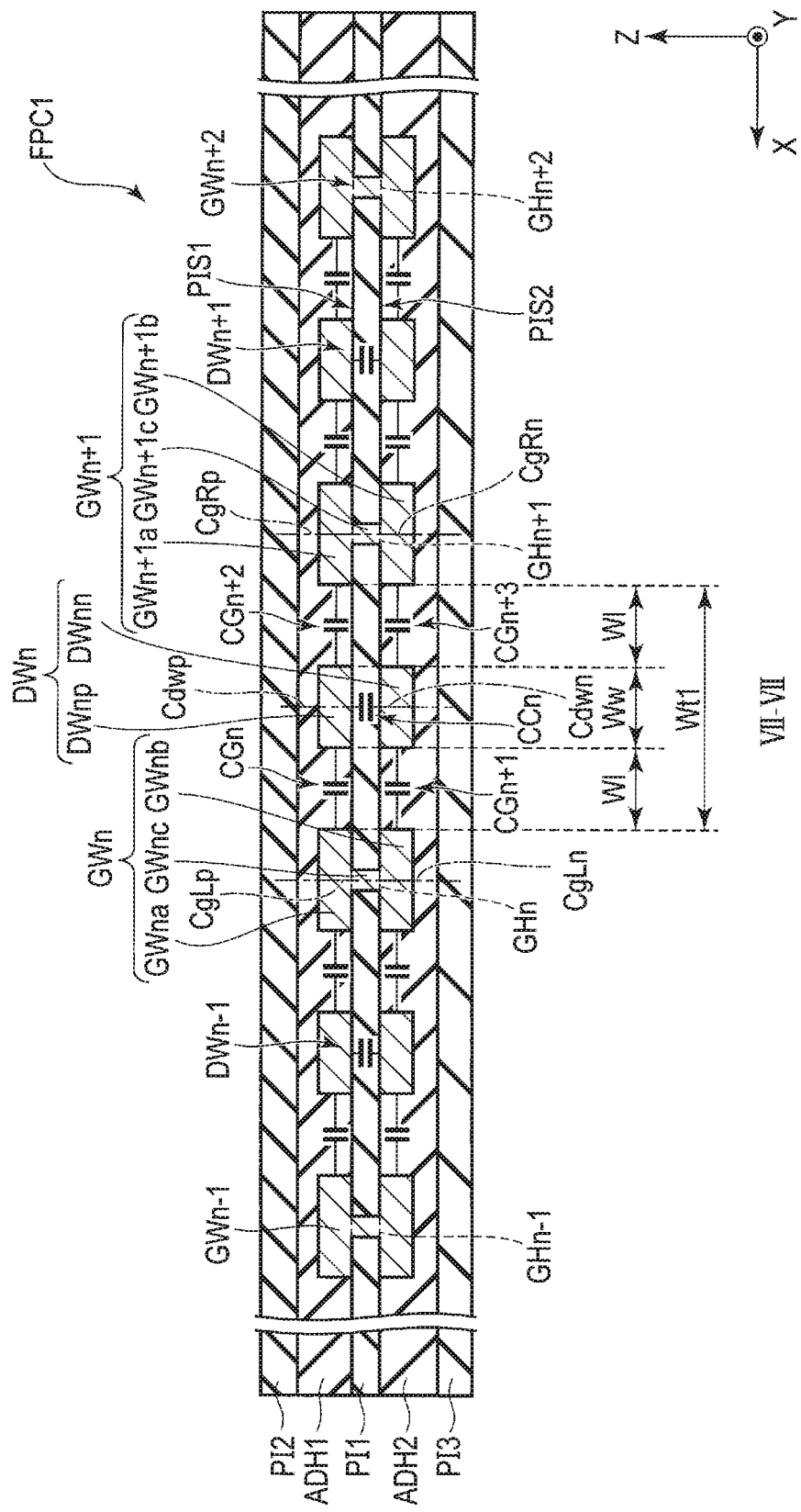
FIG. 7 is a cross-sectional view showing a part of the structure of the flexible printed circuit taken along line VII-VII of FIG. 6.

FIG. 7 is a cross-sectional view of a part of the structure of the flexible printed circuit FPC1 taken along line VII-VII of FIG. 6.

The flexible printed circuit FPC1 includes a base material PI1, first adhesive layer ADH1, second adhesive layer ADH2, first cover layer PI2, second cover layer PI3, differential line DW ( ..., DWn−1, DWn, DWn+1, ... ), and ground lines GW ( ..., GWn−1, GWn, GWn+1, GWn+2, GWn+3, ... ). The base material PI1 is formed of an insulative material. The base material PI1 is formed of, for example, a resin film or a fiber material. The resin film is a polyimide resin, polyamide resin, polyimide resin such as polyimideamide resin, a thermal cured resin such as epoxy resin, or a thermal elastic resin such as liquid crystal polymer. For convenience of explanation, the structure of the flexible printed circuit FPC1 will be explained with reference to a differential transmission path defined by the differential line DWn, and ground lines GWn and GWn+1 on the both sides of the differential line DW in the first direction X. Note that the structure of the differential transmission path defined by the differential line DWn, and ground lines GWn and GWn+1 on the both sides of the differential line DW in the first direction X can be applied to other differential transmission paths defined by a differential line DWn+1, DWn+2 other than the differential line DWn, and ground lines GWn+2 and GWn+3 other than the ground line GWn+1.

The differential line DWn includes a line DWnp which transmits a positive signal and a line DWnn which transmits a negative signal. In the differential line DWn, the lines DWnp and DWnn are formed of a conductive metal material and is formed of, for example, a metal material containing copper or an alloy mainly containing copper. In the differential line DWn, one of the lines DWnp and DWnn is positioned in the surface PIS1 on the base material PI1 and the other line is positioned in the surface below the base material PI1. In the base material PI1, the surface PIS1 is opposed to the surface PIS2. Note that the surface PIS1 may be referred to as a first surface and the surface PIS2 may be referred to as a second surface. Furthermore, in the flexible printed circuit FPC1, a direction of the first surface PIS1 of the base material PI1 may be referred to as above and a direction of the second surface PIS2 may be referred to as below. In the example depicted, the line DWnp is positioned above the base material PI1 and the line DWnn is disposed below the base material PI1. The lines DWnp and DWnn are opposed to each other with the base material PI1 interposed therebetween. In the example depicted, the lines DWnp and DWnn have a same width Ww. A center position Cdwp of the width Ww of the line DWnp and a center position Cdwn of the width Ww of the line DWnn are arranged at the same position in the first direction X. That is, the lines DWnp and DWnn are positioned to be overlap with each other in a thickness direction (direction Z) of FPC1 in substantially the entire width. Thus, a gap between the line DWnp and the line DWnn is determined by the thickness of the base material PI1. In the following description, in the first direction X, if center positions of widths of a plurality of objects are arranged at the same position, such a state will be referred to as arranged in the same position. If the center positions of widths of a plurality of objects are arranged at the same position in the first direction X, such a state will be referred to as overlapping. Furthermore, a coupling capacitance CCn is formed between the lines DWnp and DWnn.

The ground lines GWn and GWn+1 each include upper lines GWna and GWn+1a, lower lines GWnb and GWn+1b, and connector parts GWnc and GWn+1c. The ground lines GWn and GWn+1 are each set to a ground potential. In the ground lines GWn and GWn+1, the upper lines GWna and GWn+1a and the lower lines GWnb and GWn+1b are formed of a conductive metal material and are formed of, for example, a metal material containing copper or an alloy mainly containing copper. In the ground lines GWn and GWn+1, the upper lines GWna and GWn+1a are positioned above the base material PI1 and the lower lines GWnb and GWn+1b are positioned below the base material PI1. In the ground lines GWn and GWn+1, the upper lines GWna and GWn+1a and the lower lines GWnb and GWn+1b are electrically connected with the connector parts GWnc and GWn+1c provided with through holes GHn and GHn+1 passing through the base material PI1. Note that the connector parts GWnc and GWn+1c may be omitted.

In the example depicted, the upper line GWna of the ground line GWn is apart from the line DWnp of the differential line DW in the arrow direction of the first direction X (hereinafter referred to as left side) with a gap WI. Similarly, the lower line GWnb of the ground line GWn is apart from the line DWnn of the differential line DWn in the left side of the first direction X with a gap WI. The upper line GWna and the lower line GWnb are opposed to each other with the base material PI1 interposed therebetween. In the ground line GWn, the upper line GWna and the lower line GWnb are formed with the same width. In the example depicted, a center position CgLp of the upper line GWna in the width direction and a center position CgLn of the lower line GWnb in the width direction are positioned at the same position in the first direction X. Furthermore, a coupling capacitance CGn is formed between the line DWnp and the upper line GWna and a coupling capacitance CGn+1 is formed between the line DWnn and the lower line GWnb.

On the other hand, in the example depicted, the upper line GWn+1a of the ground line GWn+1 is apart from the line DWnp of the differential line DWn in the opposite direction of the left side of the first direction X (hereinafter referred to as right side) with a gap WI. Similarly, the lower line GWn+1b of the ground line GWn+1 is apart from the line DWnn of the differential line DWn in the right side of the first direction X with a gap WI. The upper line GWn+1a and the lower line GWn+1b are opposed to each other with the base material PI1 interposed therebetween. In the ground line GWn+1, the upper line GWn+1a and the lower line GWn+1b are formed with the same width. In the example depicted, a center position CgRp of the upper line GWn+1a in the width direction and a center position CgRn of the lower line GWn+1b in the width direction are positioned at the same position in the first direction X. Furthermore, a coupling capacitance CGn+2 is formed between the line DWnp and the upper line GWn+1a and a coupling capacitance CGn+3 is formed between the line DWnn and the lower line GWn+1b.

The first adhesive layer ADH1 is positioned above the base material PI1 and covers the line DWnp of the differential line DWn, upper lines GWna and GWn+1a of the ground line. The first adhesive layer ADH1 is formed of an insulative material. The first adhesive layer ADH1 is formed of, for example, an acrylic resin, epoxy resin, or polyimide resin. The first cover layer PI2 is positioned above the first adhesive layer ADH1. The first cover layer PI2 is formed of an insulative material. For example, the first cover layer PI2 is formed of a polyester resin, polyimide, or liquid crystal polymer.

The second adhesive layer ADH2 is positioned below the base material PI1 and covers the line DWnp of the differential line DWn, upper lines GWnb and GWn+1b of the ground line. The second adhesive layer ADH2 is formed of an insulative material. The second adhesive layer ADH2 is formed of, for example, an acrylic resin, epoxy resin, or polyimide resin. The second cover layer PI3 is positioned below the second adhesive layer ADH2. The second cover layer PI3 is formed of an insulative material. For example, the second cover layer PI3 is formed of a polyester resin, polyimide, or liquid crystal polymer.

Figure 20:
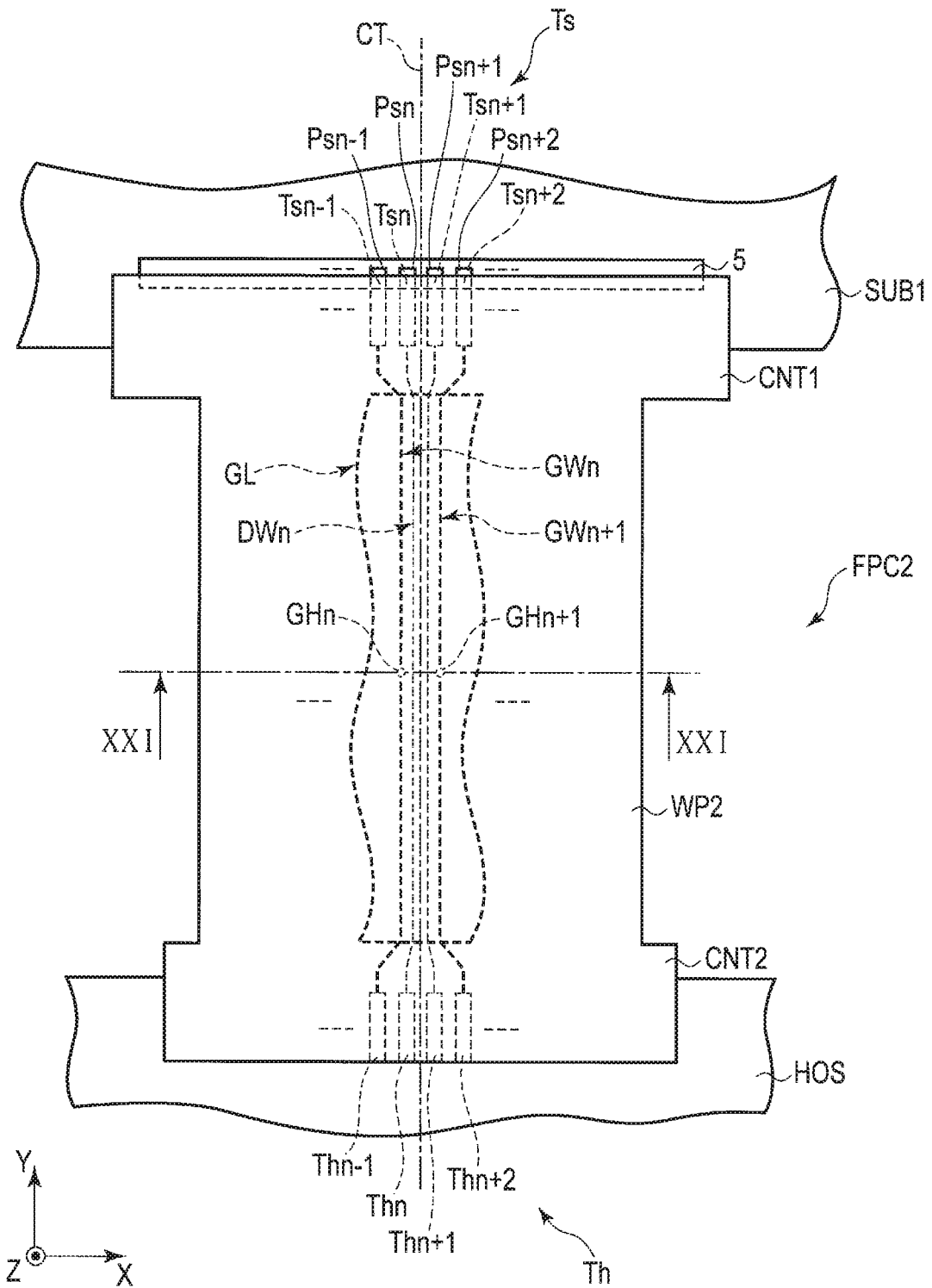
FIG. 20 is a plan view of an example of the structure of a flexible printed circuit of a comparative example.
Figure 21:
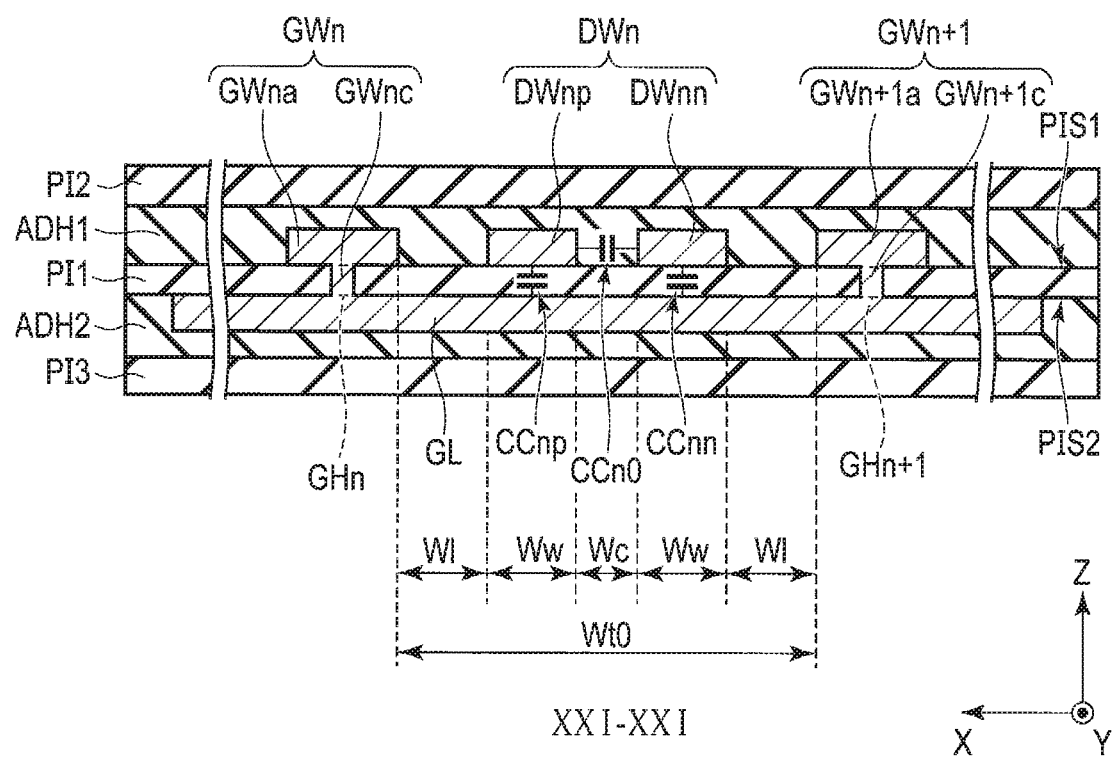
FIG. 21 is a cross-sectional view of a part of the structure of the flexible printed circuit taken along line XXI-XXI of FIG. 20.

FIG. 20 is a plan view showing an example of the structure of a flexible printed circuit FPC2 of a comparative example. FIG. 20 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC2 will be explained with reference to a differential transmission path defined by the differential line DWn, and ground lines GWn and GWn+1 on the both sides of the differential line DW in the first direction X. FIG. 21 is a cross-sectional view of a part of the structure of the flexible printed circuit FPC2 taken along line XXI-XXI of FIG. 20. As to the flexible printed circuit FPC2 of the comparative example, the elements used in the flexible printed circuit FPC1 of the present embodiment are referred to by the same referential numbers and their detailed description will be simplified or omitted.

The flexible printed circuit FPC2 can be roughly divided into connector parts CNT1 and CNT2, and line part WP2. The line part WP2 is positioned between the connector parts CNT1 and CNT2. The line part WP2 includes a ground layer GL. In the example depicted, in the flexible printed circuit FPC2, the differential line DW extends from the connector part CNT1 to the connector part CNT2 passing through the line part WP2. Similarly, in the flexible printed circuit FPC2, the ground line GW extends from the connector part CNT1 to the connector part CNT2 passing through the line part WP2. Furthermore, in a plan view, the differential line DWn and the ground lines GWn and GWn+1 overlap the ground layer GL.

In the flexible printed circuit FPC2 of the comparative example, a pair of lines DWnp and DWnn of each differential line DW are provided with the same surface of the base material PI1. The lines DWnp and DWnn are apart from each other in the first direction with a gap Wc. A coupling capacitance CCn0 is formed between the lines DWnp and DWnn. The ground layer GL is positioned below the base material PI1. For example, the ground layer GL is adhered to the lower side of the base material PI1 as a solid electrode. A coupling capacitance CCnp is formed between the line DWnp and the ground layer GL and a coupling capacitance CCnn is formed between the line DWnn and the ground layer GL.

In the flexible printed circuit FPC2, the ground lines GWn and GWn+1 include the upper lines GWna and GWn+1a and the connector parts GWnc and GWn+1c. In the ground lines GWn and GWn+1, the upper lines GWna and GWn+1a are electrically connected to the ground layer GL through the connector parts GWnc and GWn+1c provided with the through holes GHn and GHn+1. The first adhesive layer ADH1 is positioned above the base material PI1 and covers the differential line DWn and the upper lines GWna and GWn+1a of the ground lines. The second adhesive layer ADH2 is positioned below the ground layer GL.

In the example depicted, the upper line GWna of the ground line GWn is apart from the line DWnp of the differential line DWn in the left side in the first direction with a gap WI. The line DWnn of the differential line DWn is apart from the line DWnp of the differential line DWn in the right side in the first direction with a gap Wc. The upper line GWn+1a of the ground line GWn+1 is apart from the line DWnp of the differential line DWn in the right side in the first direction with a gap WI. Thus, in a comparative example, in a case where one differential line DWn is disposed, a width of the differential line DWn and a gap between two ground lines (GWn and GWn+1) positioned in the both sides of the differential line DWn are, as a total value (hereinafter referred to as an installation width), width Wt0 (=WI+Ww+Wc+Ww+WI). That is, in the flexible printed circuit FPC2, the installation width of one differential line is a width Wt0.

On the other hand, referring to FIG. 7, in the present embodiment, the installation width of the lines is width Wt1 (=WI+Ww+WI). Thus, the installation width Wt1 of the lines of the present embodiment is narrower than the installation width Wt0 of the lines of the flexible printed circuit FPC2 of the comparative example. That is, comparing the flexible printed circuit FPC1 of the present embodiment to the flexible printed circuit FPC2 of the comparative example, the installation width Wt1 is less than the installation width Wt0 by a gap Wc between the lines DWnp and DWnn and a gap Ww of one of the lines DWnp and DWnn. Thus, the line part WP1 of the flexible printed circuit FPC1 of the present embodiment can be less than a width of the line part WP2 where a pair of lines of a differential line are arranged on the same layer in parallel to each other as in the flexible printed circuit FPC2 of the comparative example.

Figure 8:
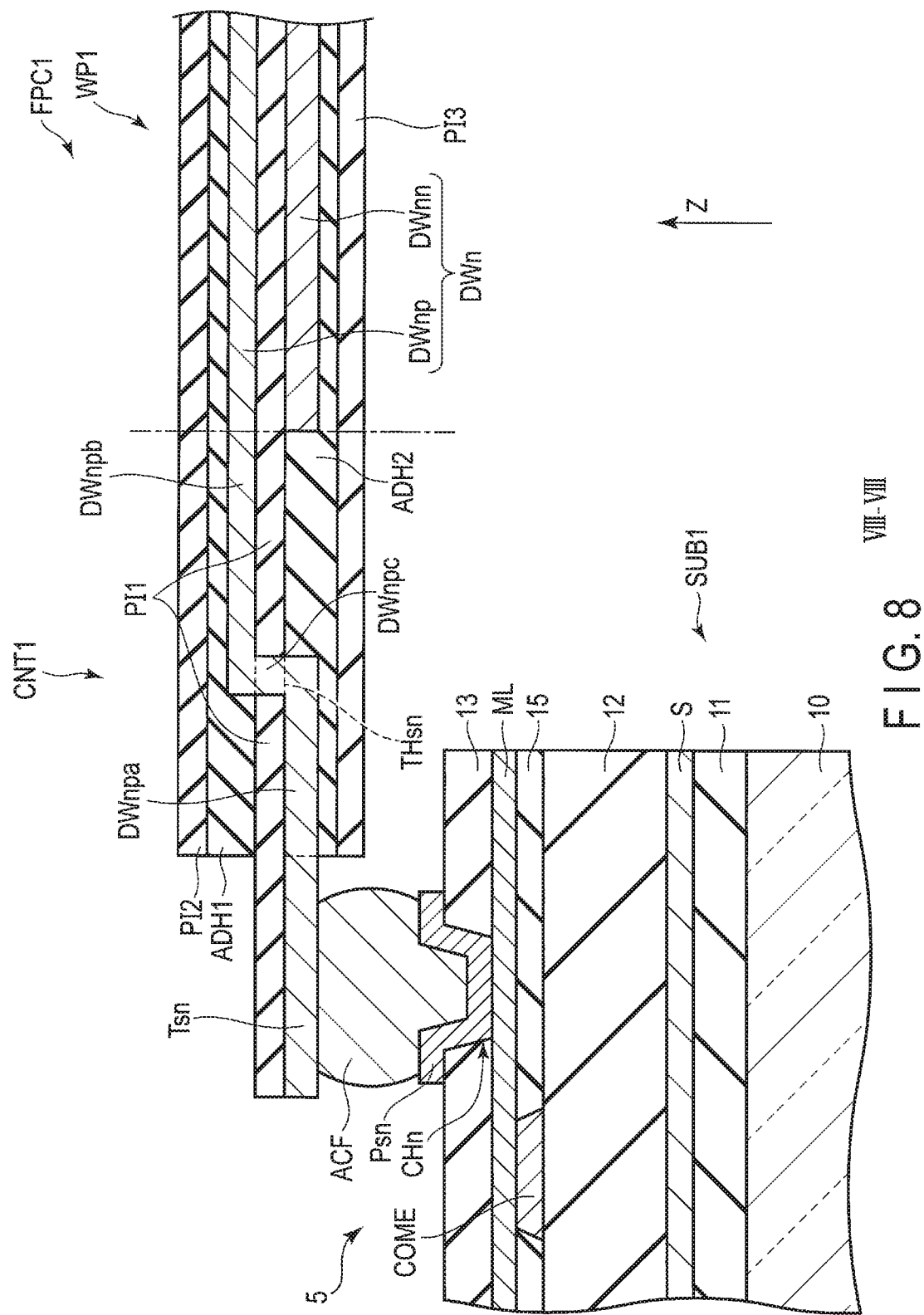
FIG. 8 is a cross-sectional view showing a part of the structure of the flexible printed circuit and a first substrate taken along line VIII-VIII of FIG. 6.

FIG. 8 is a cross-sectional view showing a part of the structure of the flexible printed circuit FPC1 and the first substrate SUB1 taken along line VIII-VIII of FIG. 6. In FIG. 8, a cross-sectional view of the flexible printed circuit FPC1 and the first substrate SUB1 in the connector part CNT1 side is shown.

In the example depicted, the differential line DWn is positioned above and/or below the base material PI1 in the line part WP1. The line DWnp of the differential line DWn includes a first part DWnpa, second part DWnpb, and third part DWnpc. The first part DWnpa is positioned below the base material PI1 while one end thereof is electrically connected to the terminal part Tsn, and the other end thereof is electrically connected to the third part DWnpc. The second part DWnpb is positioned above the base material PI1 while one end thereof is electrically connected to the third part DWnpc and the other end thereof extends along the base material PI1. The third part DWnpc is positioned in the through hole THsn passing through the base material PI1 in the connector part CNT1. Note that, in this example, the third part DWnpc is filled in the through hole THsn; however, it may be provided with the inner wall of the through hole THsn as long as it is electrically connected to the first part DWnpa and the second part DWnpb. Note that, in this example, the line DWnp includes the first part DWnpa, second part DWnpb, and third part DWnpc; however, the first part DWnpa, second part DWnpb, and third part DWnpc may be formed separately.

The terminal part Tsn is electrically connected to a pad Psn of the mount terminal 5 of the first substrate SUB1 through a conductive material such as an anisotropy conductive film (ACF). The pad Psn is a conductive material such as a transparent electrode, and is formed of indium tin oxide (ITO) or the like. In the example depicted, the pad Psn covers the inside of the contact hole CHn formed in the third insulating film 13, contacts the metal layer ML, and is partly disposed on the third insulating film 13. Note that, although the pad Psn contacts the metal layer ML in this example, the pad Psn may be formed to be electrically connected to other conductive layers such as common electrode COME, signal line S, and scan line. Note that, here, a cross-sectional view of the terminal part Tsn and the line DWnp of the differential line DWn electrically connected to the terminal part Tsn is explained while the same structure can be applied to cross-sectional views of other terminal parts Ts (Tsn−4, Tsn−3, Tsn−2, Tsn−1, Tsn+1, Tsn+2, Tsn+3, Tsn+4, Tsn+5, . . . ) and other differential lines (DWn+1, DWn+2, . . . ) or ground lines GW (GWn−1, GWn, GWn+1, . . . ) electrically connected to the other terminal parts Ts. Furthermore, although only the connector part CNT1 side is described here, the same structure or a different structure may be applied to the cross-sectional structure of the terminal part Th in the connector part CNT2 side.

In the above flexible printed circuit FPC1, the line of the differential line DW transmitting a positive signal and the line thereof transmitting a negative signal are opposed to each other with the base material PI1 interposed therebetween, and thus, a gap between the line transmitting the positive signal and the line transmitting the negative signal is determined by the thickness of the base material PI1. Thus, as compared to the flexible printed circuit FPC2 of the comparative example, the flexible printed circuit FPC1 of the present embodiment can secure symmetry of a pair of the lines of the differential line DW. Thus, the flexible printed circuit FPC1 can improve a differential effect, for example, a noise canceling effect. Thus, the display device DSP including the flexible printed circuit FPC1 can perform stable differential transmission of data. Furthermore, the differential impedance Zdiff can be controlled by adjusting a coupling capacitance between the differential line DW and the ground line GW with changing a design of the pair of lines and peripheral members. The coupling capacitance is determined on the basis of a gap between the differential line DW and the ground line GW. For example, in one differential line DW of the flexible printed circuit FPC1, the differential impedance Zndiff is, generally, controlled by adjusting the coupling capacitance CCn, CGn, CGn+1, CGn+2, and CGn+3.

In the present embodiment, the flexible printed circuit FPC1 includes a differential line DW with a line which transmits a positive signal and a line which transmits a negative signal where the lines are opposed to each other with the base material PI1 interposed therebetween. Thus, as compared to a case where a pair of lines are provided with the same plane, the installation width of the lines and installation area thereof can be decreased. That is, both surfaces of the base material PI1 can be used as a line installation area and the installation width of the lines and the installation area can be decreased. Thus, the flexible printed circuit can be miniaturized, production cost can be reduced, and freedom of design can be increased. As can be understood from the above, the display device DSP including a flexible printed circuit FPC1 which can be miniaturized.

Now, flexible printed circuits of a variation and other embodiments will be explained. In the following description, if the elements of the variation and the other embodiments are the same as in the first embodiment, they will be referred to by the same reference number and their detailed description will be simplified or omitted, and elements different from the first embodiment will be mainly explained.

FIG. 9 is a plan view showing an example of the structure of a flexible printed circuit FPC1 of a variation. As compared to the flexible printed circuit FPC1 of FIG. 6, the flexible printed circuit FPC1 of the variation of FIG. 9, through holes Ths and THh are positioned to be closer to each other in the second direction Y. Thus, a line part WP1 of the flexible printed circuit FPC1 is shorter than the line part WP1 of the flexible printed circuit FPC1 of the first embodiment in the second direction Y. Note that, in the example depicted, both positions of the through holes THs and THh are changed; however, the position of one of the through holes Ths and THh may be changed. Furthermore, in the flexible printed circuit FPC1 of the variation, the connector parts CNT1 and CNT2 are formed as steps. In the example depicted, the connector parts CNT1 and CNT2 are formed as two steps. In the variation, the same advantages obtained in the first embodiment can be achieved. In addition, in the flexible printed circuit FPC1, the position and the length of the line part WP1 can be changed by removing the positions of the through holes THs and THh. Thus, the freedom of design of the flexible printed circuit FPC1 is increased.

In the following description, for convenience of explanation, the structure of the flexible printed circuit FPC1 will be explained with reference to a differential transmission path defined by the differential line DWn, and ground lines GWn and GWn+1 on the both sides of the differential line DW in the first direction X. Note that the structure of the differential transmission path defined by the differential line DWn, and ground lines GWn and GWn+1 on the both sides of the differential line DW in the first direction X can be applied to other differential transmission paths defined by a differential line DWn+1, DWn+2 other than the differential line DWn, and ground lines GWn+2 and GWn+3 other than the ground line GWn+1.

Figure 11:
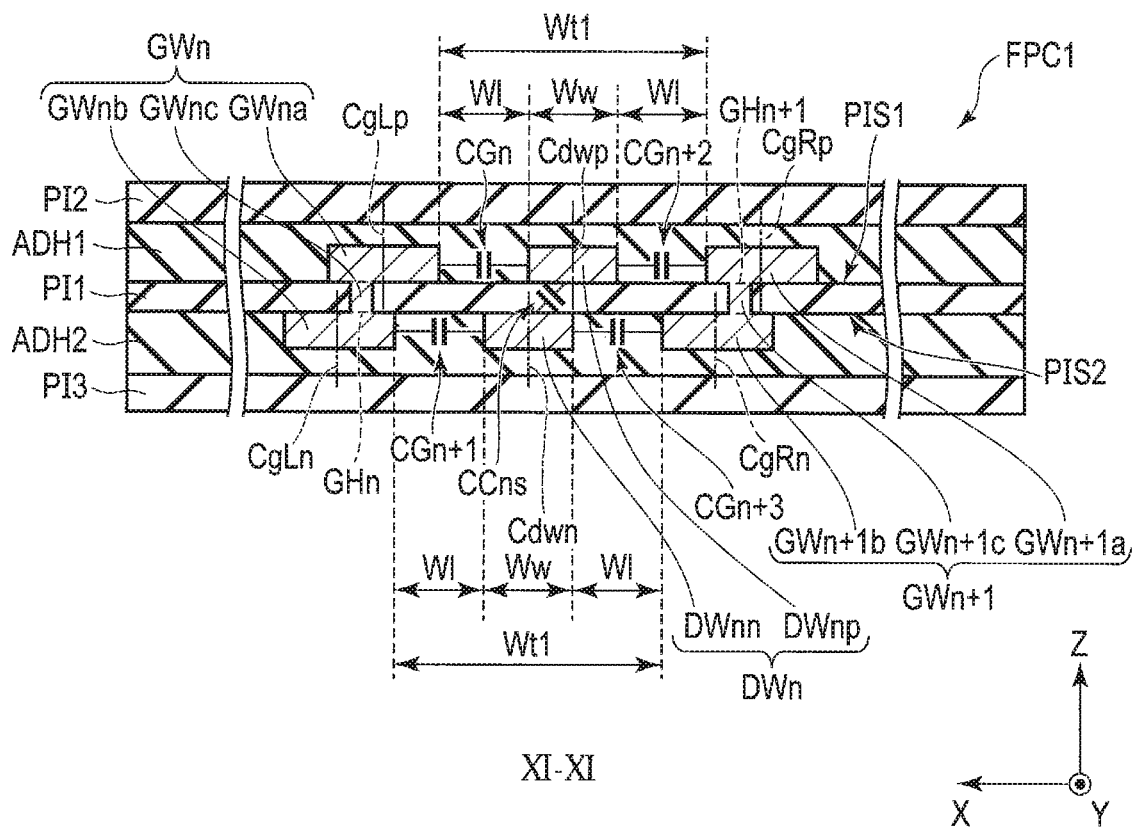
FIG. 11 is a cross-sectional view of an example of a part of the structure of the flexible printed circuit taken along line XI-XI of FIG. 10.

FIG. 10 is a plan view showing an example of the structure of a flexible printed circuit FPC1 of a second embodiment. FIG. 10 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC1 will be explained with reference to a differential transmission path defined by the differential line DWn, and ground lines GWn and GWn+1 on the both sides of the differential line DW in the first direction X. FIG. 11 is a cross-sectional view of a part of the structure of the flexible printed circuit FPC2 taken along line XI-XI of FIG. 10.

The flexible printed circuit FPC1 of the second embodiment includes a differential line DWn and ground lines GWn and GWn+1 which are arranged differently from those of the first embodiment in a plan view. In the examples of FIGS. 10 and 11, the line DWNp and ground lines GWna and GWn+1a are arranged to be shifted in the surface direction (first direction X) with respect to the line DWnn and ground lines GWnb and GWn+1b provided with the other surface side of the base material PI1, do not overlap therewith entirely in the width and partly overlap therewith in the direction Z.

In the example of FIG. 11, the lines DWnp and DWnn of the differential line DWn have an installation width of Wt1 (=WI+Ww+WI). In the differential line DWn, a center position Cdwp of the line DWnp and a center position Cdwn of the line DWnn are arranged in different positions in the first direction X. The lines DWnp and DWnn are partly opposed to each other. A state where center positions of widths of a plurality of lines are arranged in different positions in the first direction X will be referred to as shifted or partly overlapping. The upper line GWna of the ground line GWn is apart from the line DWnp of the differential line DW in the left side in the first direction X with a gap WI. The lower line GWnb of the ground line GWn is apart from the line DWnn of the differential line DW in the left side in the first direction X with a gap WI. In the ground line GWn, the upper line GWna and the lower line GWnb are shifted from each other in the first direction X. On the other hand, the upper line GWn+1a of the ground line GWn+1 is apart from the line DWnp of the differential line DWn in the right side in the first direction X with a gap WI. The lower line GWn+1b of the ground line GWn+1 is apart from the line DWnn of the differential line DWn in the right side in the first direction X with a gap WI. The upper line GWn+1a and the lower line GWn+1b of the ground line GWn+1 are shifted from each other in the first direction X.

In the structure of the flexible printed circuit FPC1 of FIG. 11, a coupling capacitance CCns is formed between the lines DWnp and DWnn. The coupling capacitance CCns is determined on the basis of a gap between the lines DWnp and DWnn. Furthermore, the coupling capacitance CCns is determined on the basis of an area where the lines DWnp and DWnn overlap with each other.

In the second embodiment, the advantages obtained in the first embodiment can be achieved. In addition, a pair of lines of the differential line DW are shifted in the first direction X to change a gap between the center of the lines. According to a change of the gap, the coupling capacitance produced between the two line of the differential line DW, for example, the coupling capacitance CCns between the lines DWnp and DWnn of the differential line DWn can be adjusted optionally. Furthermore, for example, the coupling capacitance CCns between the lines DWnp and DWnn of the differential line DWn can be adjusted by changing an area where the lines DWnp and DWnn overlap with each other. Thus, in the display device of the present embodiment, the differential impedance Zdiff of the flexible printed circuit FPC1 can be set suitably and the controllability can be improved.

Figure 12:
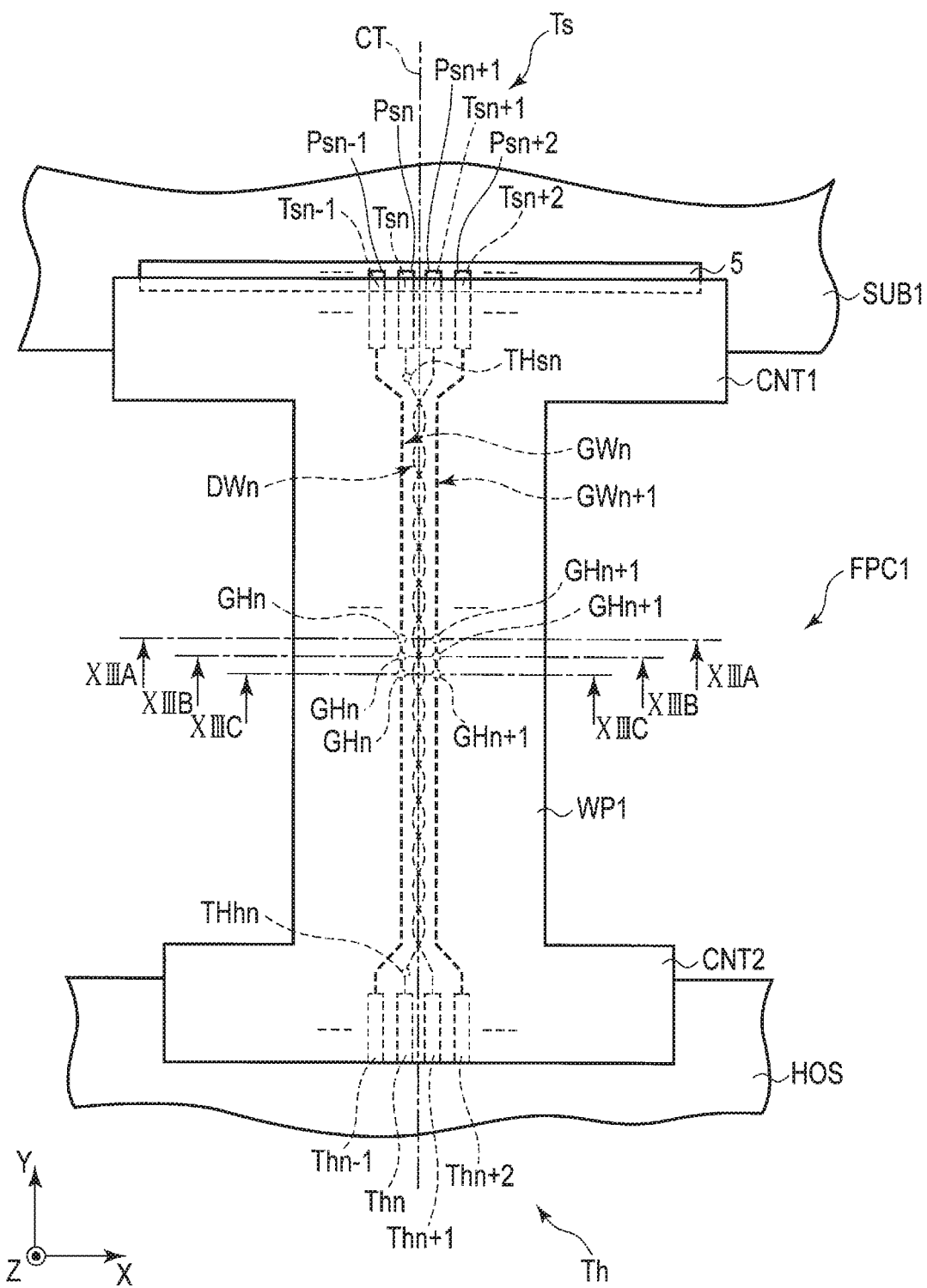
FIG. 12 is a plan view showing an example of the structure of a flexible printed circuit of a third embodiment.
Figure 13A:
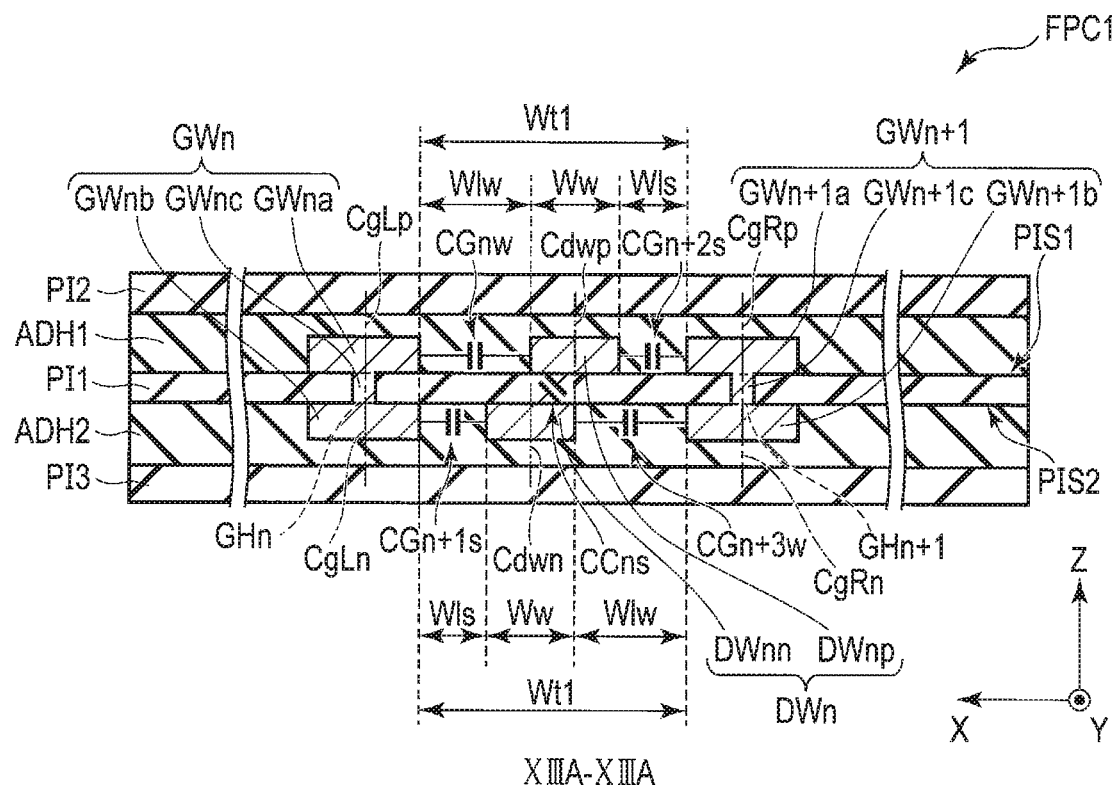
FIG. 13A is a cross-sectional view of a part of the structure of the flexible printed circuit taken along line XIIIA-XIIIA of FIG. 12.
Figure 13B:
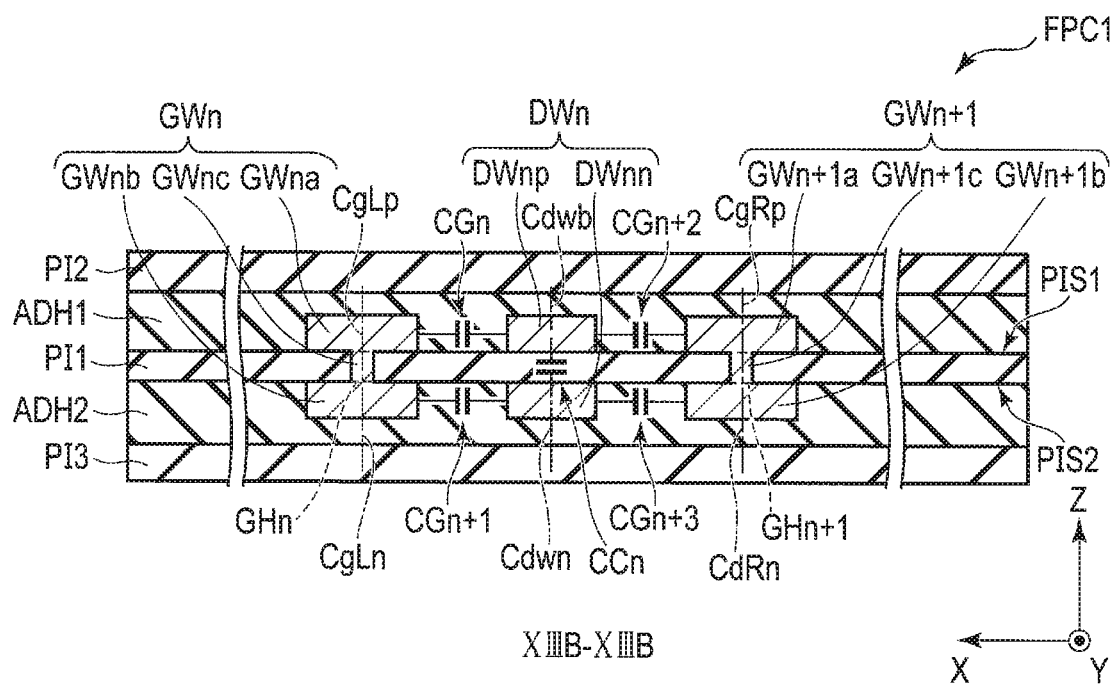
FIG. 13B is a cross-sectional view of a part of the structure of the flexible printed circuit taken along line XIIIB-XIIIB of FIG. 12.

FIG. 12 is a plan view showing an example of the structure of a flexible printed circuit FPC1 of a third embodiment. FIG. 12 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC1 will be explained with reference to a differential transmission path defined by the differential line DWn, and ground lines GWn and GWn+1 on the both sides of the differential line DW in the first direction X. FIG. 13A is a cross-sectional view of a part of the structure of the flexible printed circuit FPC1 taken along line XIIIA-XIIIA of FIG. 12. FIG. 13B is a cross-sectional view of a part of the structure of the flexible printed circuit FPC1 taken along line XIIIB-XIIIB of FIG. 12.

In the flexible printed circuit FPC1 of the third embodiment, in a plan view, in a line part WP1, a pair of line of a differential line DWn are formed in a wave shape and overlap with each other such that phases of the wave shape are shifted in the longitudinal direction (second direction Y) and cross each other at certain intervals.

FIG. 13A shows a cross-sectional view where the lines of the wave-shaped differential line DWn of FIG. 12 are apart the most. In the example depicted, the installation width of the lines DWnp and DWnn of the differential line DWn is Wt1 (=WIw+Ww+WIs). In the differential line DWn, the lines DWnp and DWnn are shifted from each other in the first direction X. The upper line GWna of the ground line GWn is apart from the line DWnp of the differential line DWn in the left side in the first direction X with a gap WI. The gap WIw is greater than the gap WI. The lower line GWnb of the ground line GWn is apart from the line DWnn of the differential line DWn in the left side in the first direction X with a gap WIs. The gap WIs is less than the gap WI. In the ground line GWn, the upper line GWna and the lower line GWnb are arranged in the same position in the first direction X. On the other hand, the upper line GWn+1a of the ground line GWn+1 is apart from the line DWnp of the differential line DWn in the right side in the first direction X with a gap WIs. The lower line GWn+1b of the ground line GWn+1 is apart from the line DWnn of the differential line DWn in the right side in the first direction X with a gap WIw. The upper line GWn+1a and the lower line GWn+1b of the ground line GWn+1 are arranged in the same position in the first direction X.

In the structure of the flexible printed circuit FPC1 of FIG. 13A, a coupling capacitance CCns is formed between the lines DWnp and DWnn. A coupling capacitance CCnw is formed between the line DWnp and the upper line GWna. A coupling capacitance CGn+1s is formed between the line DWnn and the lower line GWnb. A coupling capacitance CGn+2s is formed between the line DWnp and the upper line GWn+1a. A coupling capacitance CGn+3s is formed between the line DWnn and the lower line GWn+1a. In the structure of FIG. 13A, the differential impedance Zndiff can be controlled by adjusting the coupling capacitance CCns, CGnw, CGn+1s, CGn+2s, and CGn+3s.

FIG. 13B shows a cross-sectional view where the lines of the wave-shaped differential line DWn cross each other. In a position where the lines cross, the lines DWnp and DWnn of the differential line DWn overlap their entire widths in the third direction Z, that is, the centers thereof match. Thus, a coupling capacitance CCn formed between the lines DWnp and DWnn becomes greatest in the crossing position.

FIG. 13C is a cross-sectional view showing a part of the structure of the flexible printed circuit FPC1 taken along line XIIIC-XIIIC of FIG. 12. FIG. 13C shows a cross-sectional view of the wave-shaped differential line DWn of FIG. 12 where two lines are apart the most.

In the example depicted, the installation width of the lines DWnp and DWnn of the differential line DWn is Wt1 (=WIw+Ww+WIs). In the position depicted, the lines DWnp and DWnn are shifted from the lines DWNP and DWnn of FIG. 13A in the opposite direction. The upper line GWna of the ground line GWn is apart from the line DWnp of the differential line DWn in the left side in the first direction X with a gap WIs. The lower line GWnb of the ground line GWn is apart from the line DWnn of the differential line DWn in the left side in the first direction X with a gap WIw. On the other hand, the upper line GWn+1a of the ground line GWn+1 is apart from the line DWnp of the differential line DWn in the right side in the first direction X with a gap WIw. The lower line GWn+1b of the ground line GWn+1 is apart from the line DWnn of the differential line DWn in the right side in the first direction X with a gap WIs.

In the position depicted, a coupling capacitance CCns is formed between the lines DWnp and DWnn. The coupling capacitance CCns formed between the lines DWnp and DWnn is less than a coupling capacitance formed in FIG. 13B. A coupling capacitance CGna is formed between the line DWnp and the upper line GWna. A coupling capacitance CGn+1w is formed between the line DWnn and the lower line GWnb. A coupling capacitance CGn+2w is formed between the line DWnp and the upper line GWn+1a. A coupling capacitance CGn+3s is formed between the line DWnn and the lower line GWn+1b. In the structure of FIG. 13A, the differential impedance Zndiff can be controlled by adjusting the coupling capacitance CCns, CGns, CGn+1w, CGn+2w, and CGn+3s.

In the above-structured third embodiment, the advantages obtained in the first embodiment can be achieved. Furthermore, with a wave-shaped differential line DWn and lines DWnn and DWnp thereof crossing at a certain interval, a coupling capacitance formed at each position in the longitudinal direction of the differential line DWn can be changed. Thus, by adjusting the crossing position, the differential impedance Zndiff of the entire differential lines DWn can be adjusted to a suitable size. Furthermore, by forming a part where the pair of line of the differential line DW are shifted and a part where the pair of lines cross, a differential effect, for example, a noise canceling effect can be improved. Thus, the display device of the present embodiment can increase the controllability of the differential impedance Zdiff and the stability of differential transmission in the flexible printed circuit FPC1.

Figure 14:
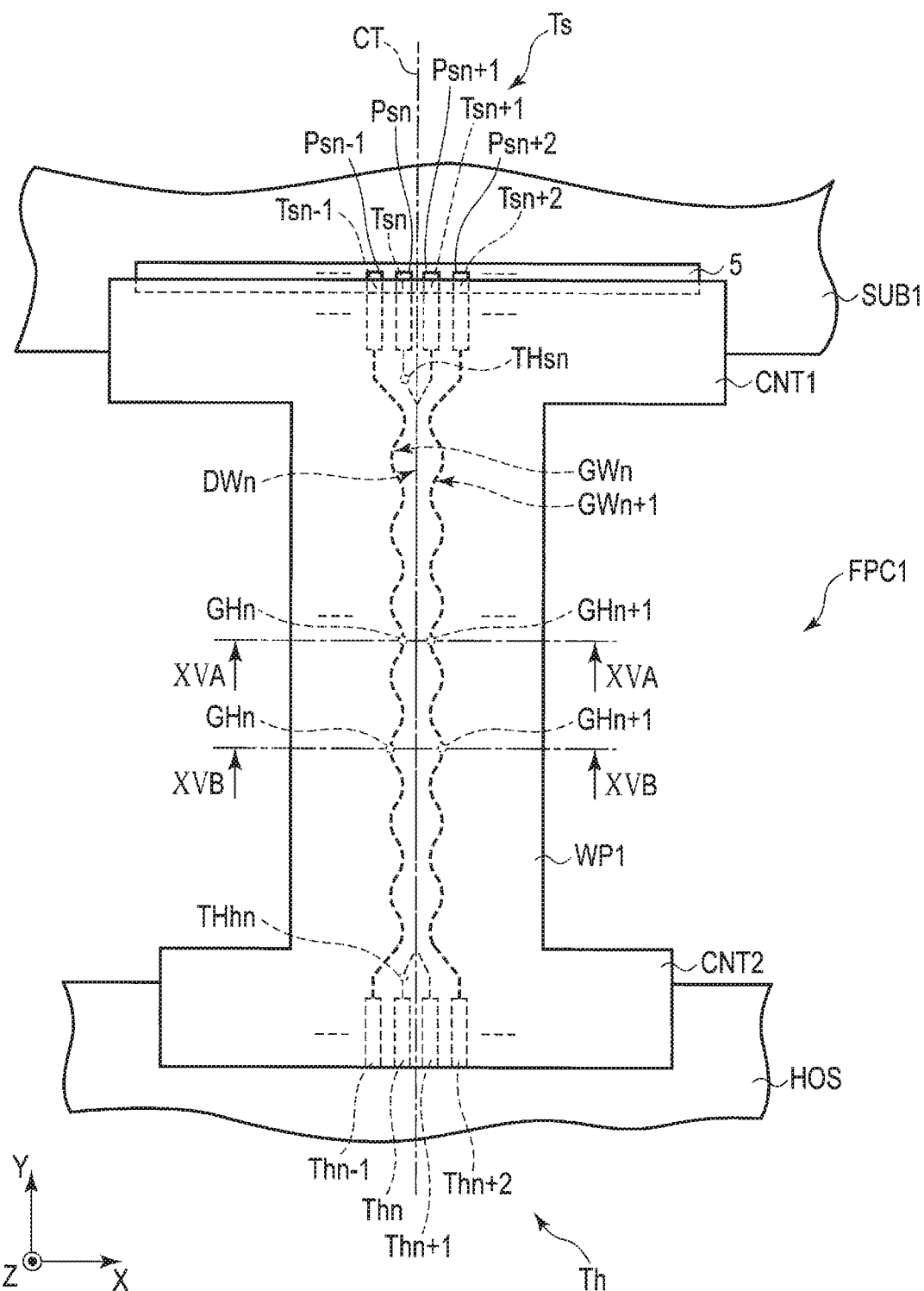
FIG. 14 is a plan view of a part of the structure of a flexible printed circuit of a fourth embodiment.

FIG. 14 is a plan view showing an example of the structure of a flexible printed circuit FPC1 of a fourth embodiment. FIG. 14 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC1 will be explained with reference to a differential transmission path defined by the differential line DWn, and ground lines GWn and GWn+1 on the both sides of the differential line DW in the first direction X.

In the flexible printed circuit FPC1 of the fourth embodiment, as compared to the first embodiment, in a line part WP1, the ground lines GWn and GWn+1 are formed in a wave shape.

FIG. 15A shows a cross-sectional view showing a part of the structure of the flexible printed circuit FPC1 taken along line XVA-XVA of FIG. 14. FIG. 15A shows a cross-sectional view where wave-shaped ground lines GWn and GWn+1 of FIG. 14 are closest to the differential line DWn.

In the example depicted, the installation width of the lines DWnp and DWnn of the differential line DWn is Wt2 (=WIs+Ww+WIs). Here, Wt2<Wt1. The upper line GWna of the ground line GWn is apart from the line DWnp of the differential line DWn in the left side in the first direction X with a gap WIs. The lower line GWnb of the ground line GWn is apart from the line DWnn of the differential line DWn in the left side in the first direction X with a gap WIs. In the ground line GWn, the upper line GWna and the lower line GWnb are arranged in the same position in the first direction X. On the other hand, the upper line GWn+1a of the ground line GWn+1 is apart from the line DWnp of the differential line DWn in the right side in the first direction X with a gap WIs. The lower line GWn+1b of the ground line GWn+1 is apart from the line DWnn of the differential line DWn in the right side in the first direction X with a gap WIs. In the ground line GWn+1, the upper line GWn+1a and the lower line GWn+1b are arranged in the same position in the first direction X.

In the structure of the flexible printed circuit FPC1 of FIG. 15A, a coupling capacitance CCns is formed between the lines DWnp and DWnn. A coupling capacitance CGns is formed between the line DWnp and the upper line GWna. A coupling capacitance CGn+1s is formed between the line DWnn and the lower line GWnb. A coupling capacitance CGn+2s is formed between the line DWnp and the upper line GWn+1a. A coupling capacitance CGn+3s is formed between the line DWnn and the lower line GWn+1b. In the flexible printed circuit FPC1, with the structure shown in FIG. 15A, the differential impedance Zndiff can be controlled by adjusting the coupling capacitance CCn, CGns, CGn+1s, CGn+2s, and CGn+3s.

FIG. 15B shows a cross-sectional view showing a part of the structure of the flexible printed circuit FPC1 taken along line XVB-XVB of FIG. 14. FIG. 15B shows a cross-sectional view where wave-shaped ground lines GWn and GWn+1 of FIG. 14 are apart from the differential line DWn the most.

In the example depicted, the installation width of the lines DWnp and DWnn of the differential line DWn is Wt3 (=WIw+Ww+WIw). Here, Wt1<Wt3<Wt0. The upper line GWna of the ground line GWn is apart from the line DWnp of the differential line DWn in the left side in the first direction X with a gap WIw. The lower line GWnb of the ground line GWn is apart from the line DWnn of the differential line DWn in the left side in the first direction X with a gap WIw. In the ground line GWn, the upper line GWna and the lower line GWnb are arranged in the same position in the first direction X. On the other hand, the upper line GWn+1a of the ground line GWn+1 is apart from the line DWnp of the differential line DWn in the right side in the first direction X with a gap WIw. The lower line GWn+1b of the ground line GWn+1 is apart from the line DWnn of the differential line DWn in the right side in the first direction X with a gap WIw. In the ground line GWn+1, the upper line GWn+1a and the lower line GWn+1b are arranged in the same position in the first direction X.

In the structure of the flexible printed circuit FPC1 of FIG. 15B, a coupling capacitance CCns is formed between the lines DWnp and DWnn. A coupling capacitance CGnw is formed between the line DWnp and the upper line GWna. A coupling capacitance CGn+1w is formed between the line DWnn and the lower line GWnb. A coupling capacitance CGn+2w is formed between the line DWnp and the upper line GWn+1a. A coupling capacitance CGn+3w is formed between the line DWnn and the lower line GWn+1b. The coupling capacitance of CGnw, CGn+1w, CGn+2w, and CGn+3w is less than CGns, CGn+1s, CGn+2s, and CGn+3s. Thus, in the flexible printed circuit FPC1, with the structure shown in FIG. 15B, the differential impedance Zndiff can be controlled by adjusting the coupling capacitance CCn, CGnw, CGn+1w, CGn+2w, and CGn+3w.

In the above-structured fourth embodiment, the advantages obtained in the first embodiment can be achieved. Furthermore, with a wave-shaped ground lines GW, a gap between the differential line DW and the ground line GW can be adjusted. Thus, a coupling capacitance formed between the differential line DW and the ground line GW can be adjusted. Thus, in the display device of the present embodiment, the controllability of the differential impedance Zndiff of the flexible printed circuit FPC1 can be improved.

FIG. 16 is a plan view showing an example of the structure of a flexible printed circuit FPC1 of a fifth embodiment. FIG. 16 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC1 will be explained with reference to a differential transmission path defined by the differential line DWn, and ground lines GWn and GWn+1 on the both sides of the differential line DW in the first direction X.

In the flexible printed circuit FPC1 of the fifth embodiment, as compared to the first embodiment, in a line part WP1, the ground lines GWn and GWn+1 are formed in a wave shape and cross each other at certain intervals.

FIG. 17A shows a cross-sectional view showing a part of the structure of the flexible printed circuit FPC1 taken along line XVIIA-XVIIA of FIG. 16. FIG. 17A shows a cross-sectional view where wave-shaped ground lines GWn and GWn+1 of FIG. 16 are apart from each other the most.

In the example depicted, the installation width of the line DWnp of the differential line DWn is Wt2 (=WIs+Ww+WIs), and the installation width of the line DWnn of the differential line DWn is Wt3 (=WIw+Ww+WIw). The upper line GWna of the ground line GWn is apart from the line DWnp of the differential line DWn in the left side in the first direction X with a gap WIs. The lower line GWnb of the ground line GWn is apart from the line DWnn of the differential line DWn in the left side in the first direction X with a gap WIw. In the ground line GWn, the upper line GWna and the lower line GWnb are shifted from each other in the first direction X. On the other hand, the upper line GWn+1a of the ground line GWn+1 is apart from the line DWnp of the differential line DWn in the right side in the first direction X with a gap WIs. The lower line GWn+1b of the ground line GWn+1 is apart from the line DWnn of the differential line DWn in the right side in the first direction X with a gap WIw. In the ground line GWn+1, the upper line GWn+1a and the lower line GWn+1b are shifted from each other in the first direction X.

In the structure of the flexible printed circuit FPC1 of FIG. 17A, a coupling capacitance CCn is formed between the lines DWnp and DWnn. A coupling capacitance CGns is formed between the line DWnp and the upper line GWna. A coupling capacitance CGn+1w is formed between the line DWnn and the lower line GWnb. A coupling capacitance CGn+2s is formed between the line DWnp and the upper line GWn+1a. A coupling capacitance CGn+3w is formed between the line DWnn and the lower line GWn+1b. The coupling capacitance of CGns and CGn+2s is less than CGn+1w and CGn+3w. In the flexible printed circuit FPC1, with the structure shown in FIG. 17A, the differential impedance Zndiff can be controlled by adjusting the coupling capacitance CCn, CGns, CGn+1w, CGn+2s, and CGn+3w.

FIG. 17B shows a cross-sectional view showing a part of the structure of the flexible printed circuit FPC1 taken along line XVIIB-XVIIB of FIG. 16. FIG. 17B shows a cross-sectional view where wave-shaped ground lines GWn and GWn+1 of FIG. 16 are apart from each other the most.

In the example depicted, the installation width of the line DWnp of the differential line DWn is Wt3 (=WIw+Ww+WIw), and the installation width of the line DWnn of the differential line DWn is Wt2 (=WIs+Ww+WIs). The upper line GWna of the ground line GWn is apart from the line DWnp of the differential line DWn in the left side in the first direction X with a gap WIw. The lower line GWnb of the ground line GWn is apart from the line DWnn of the differential line DWn in the left side in the first direction X with a gap WIs. In the ground line GWn, the upper line GWna and the lower line GWnb are shifted from each other in the first direction X. On the other hand, the upper line GWn+1a of the ground line GWn+1 is apart from the line DWnp of the differential line DWn in the right side in the first direction X with a gap WIw. The lower line GWn+1b of the ground line GWn+1 is apart from the line DWnn of the differential line DWn in the right side in the first direction X with a gap WIs. In the ground line GWn+1, the upper line GWn+1a and the lower line GWn+1b are shifted from each other in the first direction X.

In the structure of the flexible printed circuit FPC1 of FIG. 17B, a coupling capacitance CCn is formed between the lines DWnp and DWnn. A coupling capacitance CGnw is formed between the line DWnp and the upper line GWna. A coupling capacitance CGn+1s is formed between the line DWnn and the lower line GWnb. A coupling capacitance CGn+2w is formed between the line DWnp and the upper line GWn+1a. A coupling capacitance CGn+3s is formed between the line DWnn and the lower line GWn+1b. The coupling capacitance of CGnw and CGn+2w is less than CGn+1s and CGn+3s. Thus, in the flexible printed circuit FPC1, with the structure shown in FIG. 17B, the differential impedance Zndiff can be controlled by adjusting the coupling capacitance CCn, CGnw, CGn+1s, CGn+2w, and CGn+3s.

In the above-structured fifth embodiment, the advantages obtained in the first embodiment can be achieved. Furthermore, with a wave-shaped ground lines GW crossing at certain intervals, a gap between the differential line DW and the ground line GW can be adjusted. Thus, a coupling capacitance formed between the differential line DW and the ground line GW can be adjusted. Thus, in the display device of the present embodiment, the controllability of the differential impedance Zndiff of the flexible printed circuit FPC1 can be improved.

Figure 18:
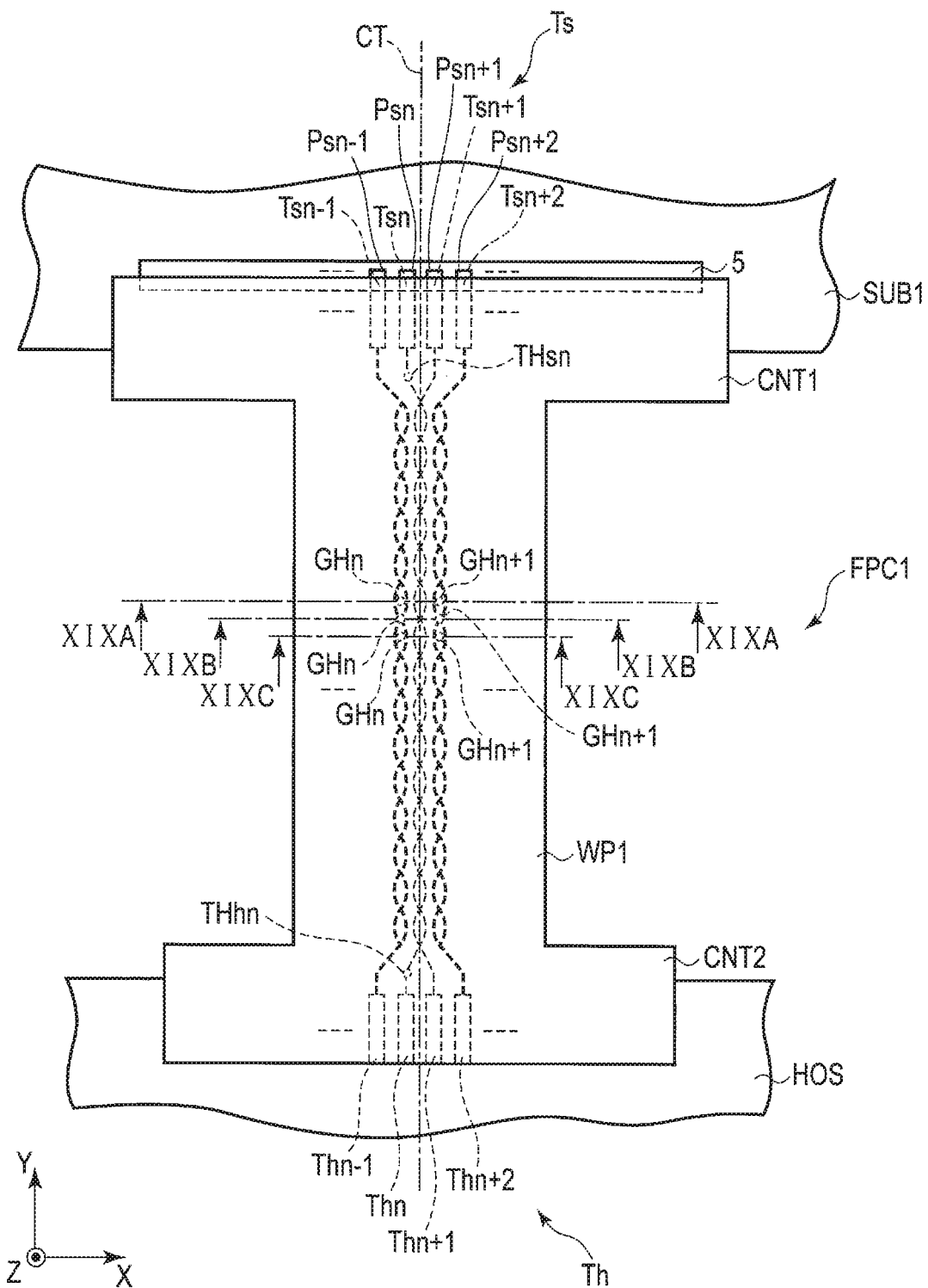
FIG. 18 is a plan view of an example of a flexible printed circuit of a sixth embodiment.

FIG. 18 is a plan view showing an example of the structure of a flexible printed circuit FPC1 of a sixth embodiment. FIG. 18 shows one differential line DWn and two ground lines GWn and GWn+1 on the both sides of the differential line; however, the differential lines and ground lines are arranged alternately in the actual structure as in FIG. 6. For convenience of explanation, the structure of the flexible printed circuit FPC1 will be explained with reference to a differential transmission path defined by the differential line DWn, and ground lines GWn and GWn+1 on the both sides of the differential line DW in the first direction X.

In the flexible printed circuit FPC1 of the sixth embodiment, as compared to the first embodiment, in a line part WP1, a pair of lines of the differential line DWn and the ground lines GWn and GWn+1 are formed in a wave shape and cross each other at certain intervals.

Figure 19A:
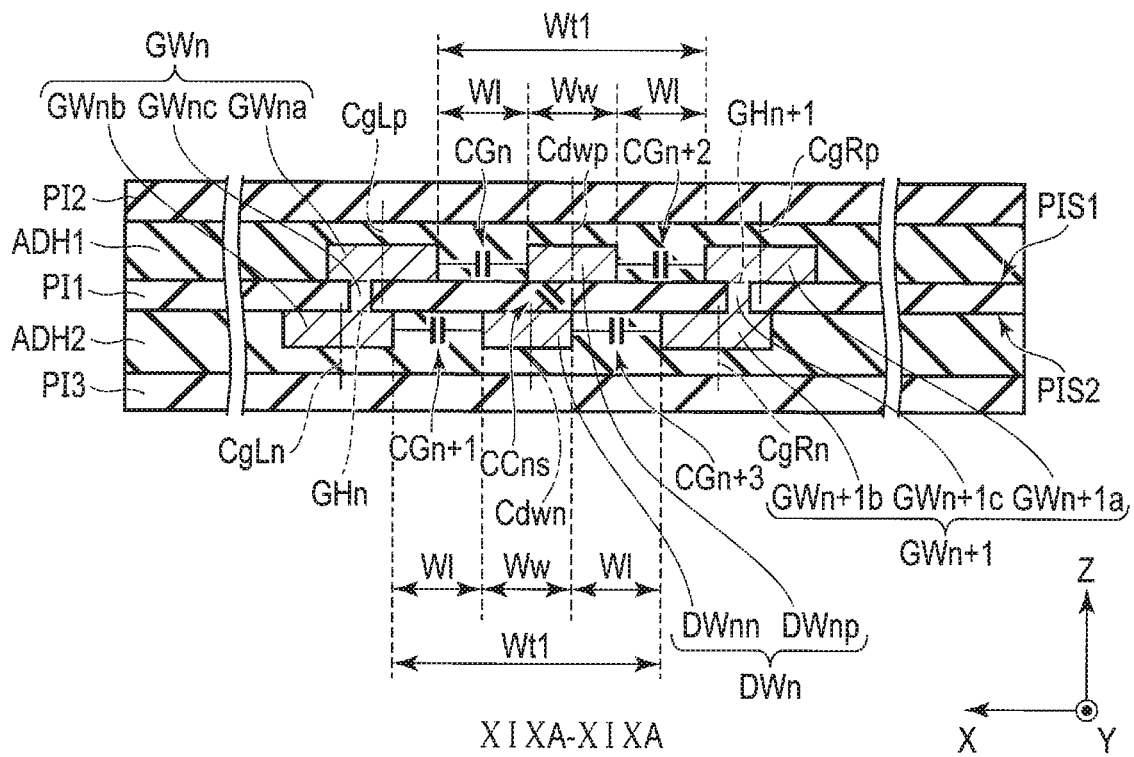
FIG. 19A is a cross-sectional view of a part of the structure of the flexible printed circuit taken along line XIXA-XIXA of FIG. 18.
Figure 19B:
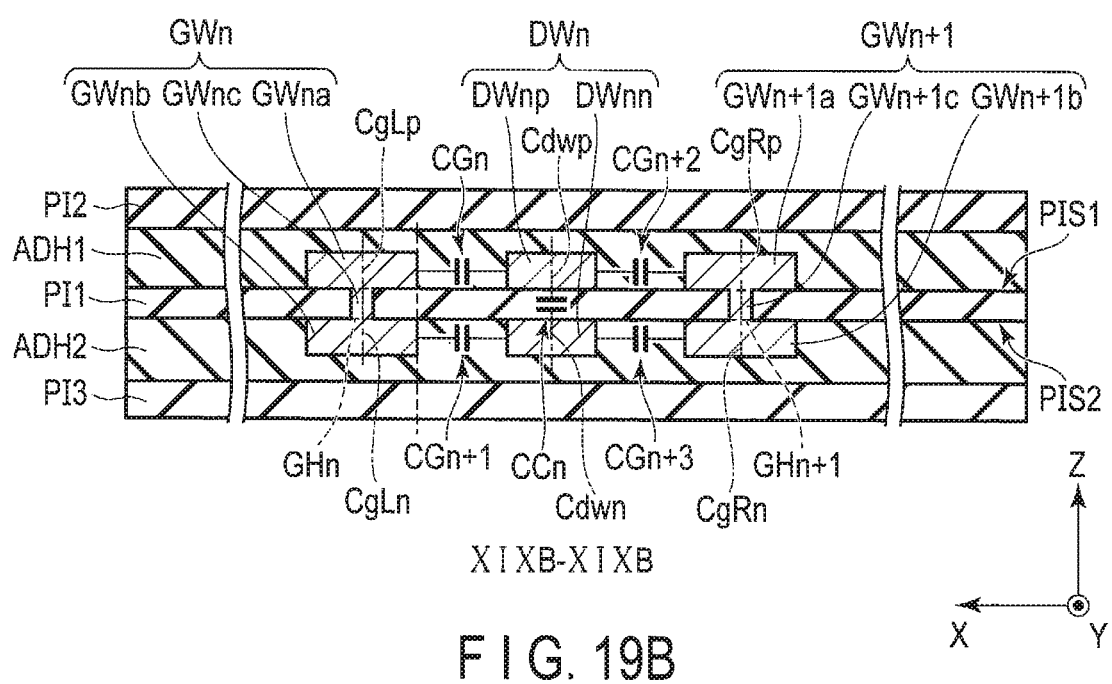
FIG. 19B is a cross-sectional view of a part of the structure of the flexible printed circuit taken along line XIXB-XIXB of FIG. 18.
Figure 19C:
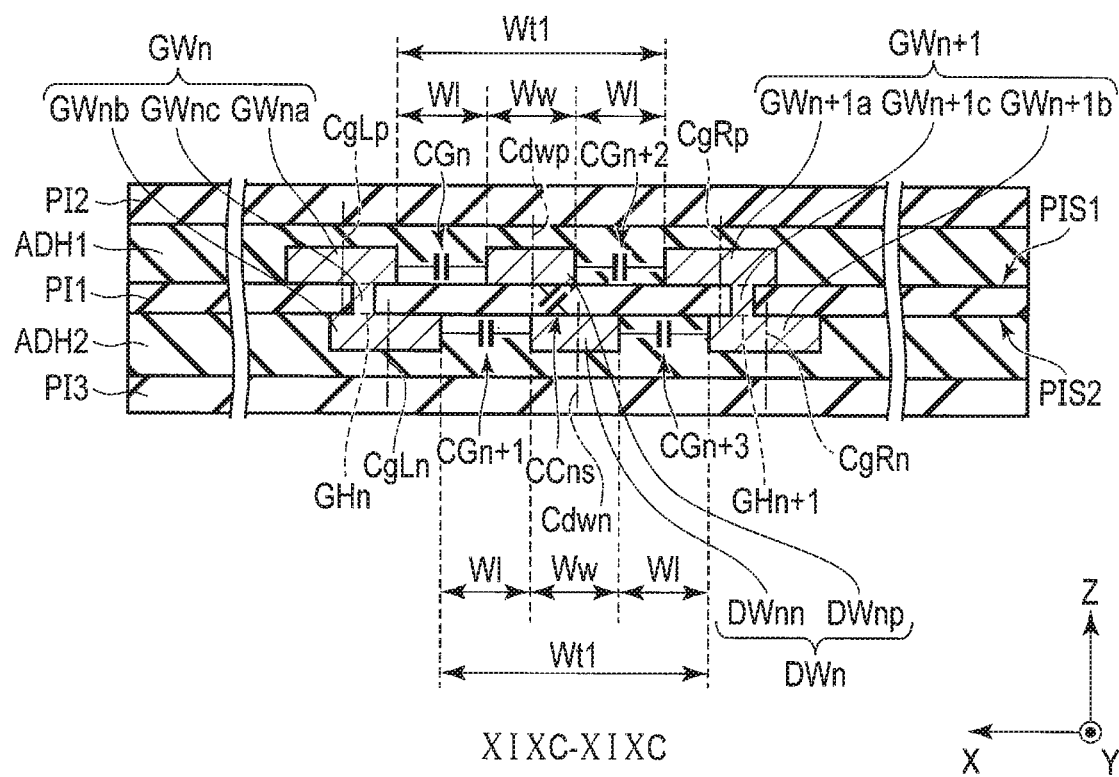
FIG. 19C is a cross-sectional view of a part of the structure of the flexible printed circuit taken along line XIXC-XIXC of FIG. 18.

FIG. 19A is a cross-sectional view of a part of the structure of the flexible printed circuit taken along line XIXA-XIXA of FIG. 18. FIG. 19B is a cross-sectional view of a part of the structure of the flexible printed circuit taken along line XIXB-XIXB of FIG. 18. FIG. 19C is a cross-sectional view of a part of the structure of the flexible printed circuit taken along line XIXC-XIXC of FIG. 18.

FIG. 19A shows a cross-sectional view where the pair of lines of the wave-shaped differential line DWn and the wave-shaped ground lines GWn and GWn+1 of FIG. 18 are apart from each other the most. In the example depicted, the installation width of the lines DWnp and DWnn of the differential line DWn is Wt1 (=WI+Ww+WI). In the differential line DWn, the lines DWnp and DWnn are shifted from each other in the first direction X. The upper line GWna of the ground line GWn is apart from the line DWnp of the differential line DWn in the left side in the first direction X with a gap WI. The lower line GWnb of the ground line GWn is apart from the line DWnn of the differential line DWn in the left side in the first direction X with a gap WI. In the ground line GWn, the upper line GWna and the lower line GWnb are shifted from each other in the first direction X. On the other hand, the upper line GWn+1a of the ground line GWn+1 is apart from the line DWnp of the differential line DWn in the right side in the first direction X with a gap WI. The lower line GWn+1b of the ground line GWn+1 is apart from the line DWnn of the differential line DWn in the right side in the first direction X with a gap WI. In the ground line GWn+1, the upper line GWn+1a and the lower line GWn+1b are shifted from each other in the first direction X.

In the structure of the flexible printed circuit FPC1 of FIG. 19A, a coupling capacitance CCns is formed between the lines DWnp and DWnn. A coupling capacitance CGn is formed between the line DWnp and the upper line GWna. A coupling capacitance CGn+1 is formed between the line DWnn and the lower line GWnb. A coupling capacitance CGn+2 is formed between the line DWnp and the upper line GWn+1a. A coupling capacitance CGn+3 is formed between the line DWnn and the lower line GWn+1b. In the flexible printed circuit FPC1, with the structure shown in FIG. 19A, the differential impedance Zndiff can be controlled by adjusting the coupling capacitance CCns, CGn, CGn+1, CGn+2, and CGn+3.

FIG. 19B shows a cross-sectional view where the lines of the wave-shaped differential line DWn and the ground lines GWn and GWn+1 cross each other. In a position where the lines cross, the lines DWnp and DWnn of the differential line DWn overlap their entire widths in the third direction Z, that is, the centers thereof match. Thus, a coupling capacitance CCn formed between the lines DWnp and DWnn becomes greatest in the crossing position. In that position, the upper line GWna and the lower line GWnb of the ground line GW overlap their entire widths in the third direction Z. Similarly, the upper line GWn+1a and the lower line GWn+1b of the ground line GWn+1 overlap their entire widths in the third direction Z.

FIG. 19C is a cross-sectional view showing a part of the structure of the flexible printed circuit FPC1 taken along line XIXC-XIXC shown in FIG. 18. FIG. 19C shows a cross-sectional view where the pair of lines of the wave-shaped differential line DWn and the wave-shaped ground lines GWn and GWn+1 of FIG. 18 are apart from each other the most.

In the example depicted, the installation width of the lines DWnp and DWnn of the differential line DWn is Wt1 (=WI+Ww+WI). In the position depicted, the lines DWnp and DWnn are shifted from the lines DWnp and DWnn of FIG. 19A in the first direction X. Similarly, the upper line GWna and the lower line GWnb of the ground line GWn are shifted from the upper line GWna and the lower line GWnb of FIG. 19A in the opposite direction in the first direction X. The upper line GWna of the ground line GWn is apart from the line DWnp of the differential line DWn in the left side in the first direction X with a gap WI. The lower line GWnb of the ground line GWn is apart from the line DWnn of the differential line DWn in the left side in the first direction X with a gap WI. On the other hand, the upper line GWn+1a of the ground line GWn+1 is apart from the line DWnp of the differential line DWn in the right side in the first direction X with a gap WI. The lower line GWn+1b of the ground line GWn+1 is apart from the line DWnn of the differential line DWn in the right side in the first direction X with a gap WI.

In the structure of the flexible printed circuit FPC1 of FIG. 19C, a coupling capacitance CCns is formed between the lines DWnp and DWnn. A coupling capacitance CGn is formed between the line DWnp and the upper line GWna. A coupling capacitance CGn+1 is formed between the line DWnn and the lower line GWnb. A coupling capacitance CGn+2 is formed between the line DWnp and the upper line GWn+1a. A coupling capacitance CGn+3 is formed between the line DWnn and the lower line GWn+1b. In the flexible printed circuit FPC1, with the structure shown in FIG. 19C, the differential impedance Zndiff can be controlled by adjusting the coupling capacitance CCns, CGn, CGn+1, CGn+2, and CGn+3.

In the above-structured sixth embodiment, the advantages obtained in the above embodiments can be achieved. Furthermore, with a wave-shaped lines of the differential line DW and the ground lines GW arranged at certain intervals in the first direction X and extending in the second direction Y, evenness of the coupling capacitance between the differential line DW and the ground line GW can be secured. Thus, in the flexible printed circuit FPC1, discontinuous differential impedance can be prevented in the differential line DW. Thus, in the display device of the present embodiment, the controllability of the differential impedance Zndiff of the flexible printed circuit FPC1 can be improved and stability of differential transmission can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a display panel including a terminal part; and
    a circuit substrate including:
        a first insulating layer;
        a first line disposed on a first surface of the first insulating layer and configured to transmit a differential signal;
        a second line disposed on a second surface of the first insulating layer opposed to the first surface and configured to produce a capacitance coupling with the first line and to transmit the differential signal with the first line;
        a first ground line configured to produce a capacitance coupling with the first line and disposed on the first surface while being apart from the first line;
        a second ground line configured to produce a capacitance coupling with the first line and disposed on the first surface while being apart from the first line in the side opposite to the first ground line;
        a third ground line configured to produce a capacitance coupling with the second line and disposed on the second surface while being apart from the second line;
        a fourth ground line configured to produce a capacitance coupling with the second line and disposed on the second surface while being apart from the second line in the side opposite to the third ground line; and
    a connector part electrically connected to the terminal part,
        wherein the first and second lines extend in a substantially linear fashion and the first to fourth ground lines extend in a periodical wavelike fashion in a plan view, and wherein each of the first and second lines is in a respective corresponding layer and overlap each other, the first and third ground lines each have a first phase of a periodical wavelike shape in the respective corresponding layers and overlap each other on the first and second surfaces, and the second and fourth ground lines each have a second phase of the periodical wavelike shape in the respective corresponding layers and overlap each other on the first and second surfaces.

2. The display device of claim 1, wherein the circuit substrate includes a through hole passing through the first insulating layer and a third line disposed on the first surface and electrically connected to the second line through the through hole.

3. The display device of claim 2, wherein, in a plan view, the circuit substrate extend in the opposite direction to the connector part and includes a narrowed part which is narrowed in a position beyond the through hole in the extending direction.

4. The display device of claim 1, wherein the circuit substrate includes a second insulating layer opposed to the first surface of the first insulating layer and a third insulating layer opposed to the second surface of the first insulating layer.

5. The display device of claim 4, wherein the first insulating layer includes a polyimide resin, polyamide resin, polyamideimide resin, epoxy resin, or liquid crystal polymer, and the second insulating layer and the third insulating layer include a polyester resin, polyimide, or liquid crystal polymer.

6. The display device of claim 1, wherein the circuit substrate includes a first connection hole passing through the first insulating layer, a second connection hole passing through the first insulating layer, a first connector part electrically connecting the first ground line and the third ground line through the first connector hole, and a second connector part electrically connecting the second ground line and the fourth ground line through the second connection hole.

7. The display device of claim 6 wherein the circuit substrate includes, in a plan view, a third part where the first ground line and the third ground line overlap with each other, and a fourth part where the second ground line and the fourth ground line overlap with each other.

8. The display device of claim 6, wherein the circuit substrate includes, in a plan view, a fifth part where the first ground line and the third ground line are shifted from each other, and a sixth part where the second ground line and the fourth ground line are shifted from each other.

9. The display device of claim 1, wherein the first phase and the second phase of the periodical wavelike shape are opposite phases.

10. A circuit substrate comprising:
    a first insulating layer;
    a first line disposed on a first surface of the first insulating layer and configured to transmit a differential signal;
    a second line disposed on a second surface of the first insulating layer opposed to the first surface and configured to produce a capacitance coupling with the first line and to transmit the differential signal with the first line;
    a first ground line configured to produce a capacitance coupling with the first line and disposed on the first surface while being apart from the first line;
    a second ground line configured to produce a capacitance coupling with the first line and disposed on the first surface while being apart from the first line in the side opposite to the first ground line;
    a third ground line configured to produce a capacitance coupling with the second line and disposed on the second surface while being apart from the second line; and a fourth ground line configured to produce a capacitance coupling with the second line and disposed on the second surface while being apart from the second line in the side opposite to the third ground line, wherein the first and second lines extend in a substantially linear fashion and the first to fourth ground lines extend in a periodical wavelike fashion in a plan view, and wherein each of the first and second lines is a respective corresponding layer and overlap each other, the first and third ground lines each have a first phase of a periodical wave shape in the respective corresponding layers and overlap each other on the first and second surfaces, and the second and fourth ground lines each have a second phase of the periodical wavelike shape in the respective corresponding layers and overlap each other on the first and second surfaces.

11. The circuit substrate of claim 10, further comprising a through hole passing through the first insulating layer and a third line disposed on the first surface and electrically connected to the second line through the through hole.

12. The circuit substrate of claim 11, further comprising, in a plan view, a narrowed part which is narrowed in a position beyond the through hole in an extending direction.

13. The circuit substrate of claim 10, further comprising a second insulating layer opposed to the first surface of the first insulating layer and a third insulating layer opposed to the second surface of the first insulating layer.

14. The circuit substrate of claim 13, wherein the first insulating layer includes a polyimide resin, polyamide resin, polyamideimide resin, epoxy resin, or liquid crystal polymer, and the second insulating layer and the third insulating layer include a polyester resin, polyimide, or liquid crystal polymer.

15. The circuit substrate of claim 10, further comprising a first connection hole passing through the first insulating layer, a second connection hole passing through the first insulating layer, a first connector part electrically connecting the first ground line and the third ground line through the first connector hole, and a second connector part electrically connecting the second ground line and the fourth ground line through the second connection hole.

16. The circuit substrate of claim 15, further comprising, in a plan view, a third part where the first ground line and the third ground line overlap with each other, and a fourth part where the second ground line and the fourth ground line overlap with each other.

17. The circuit substrate of claim 15, further comprising, in a plan view, a fifth part where the first ground line and the third ground line are shifted from each other, and a sixth part where the second ground line and the fourth ground line are shifted from each other.

18. The circuit substrate of claim 10, wherein the first phase and the second phase of the periodical wavelike shape are opposite phases.

* * * * *